(12) United States Patent
Saigusa et al.

(10) Patent No.: US 11,874,549 B2
(45) Date of Patent: Jan. 16, 2024

(54) OPTICAL ELEMENT AND LIQUID CRYSTAL DISPLAY DEVICE

(71) Applicant: Sharp Display Technology Corporation, Kameyama (JP)

(72) Inventors: Ryosuke Saigusa, Kameyama (JP); Akira Sakai, Kameyama (JP); Yuichi Kawahira, Kameyama (JP); Masahiro Hasegawa, Kameyama (JP)

(73) Assignee: Sharp Display Technology Corporation, Kameyama (JP)

(*) Notice: Subject to any disclaimer, the term of this patent is extended or adjusted under 35 U.S.C. 154(b) by 0 days.

(21) Appl. No.: 18/199,882

(22) Filed: May 19, 2023

(65) Prior Publication Data

US 2023/0384634 A1 Nov. 30, 2023

(30) Foreign Application Priority Data

May 25, 2022 (JP) .................................. 2022-085256
Nov. 24, 2022 (JP) .................................. 2022-187447

(51) Int. Cl.
*G02F 1/1335* (2006.01)
*G02F 1/13363* (2006.01)

(52) U.S. Cl.
CPC .... *G02F 1/133528* (2013.01); *G02F 1/13363* (2013.01); *G02F 1/133562* (2021.01); *G02F 1/133567* (2021.01); *G02F 2413/02* (2013.01); *G02F 2413/06* (2013.01)

(58) Field of Classification Search
None
See application file for complete search history.

(56) References Cited

U.S. PATENT DOCUMENTS

| 2010/0231831 A1 | 9/2010 | Miyatake et al. |
| 2012/0229735 A1 | 9/2012 | Miyatake et al. |
| 2015/0205157 A1* | 7/2015 | Sakai .................. G02F 1/13363 349/62 |

FOREIGN PATENT DOCUMENTS

JP 2013-130882 A 7/2013

* cited by examiner

*Primary Examiner* — Phu Vu
(74) *Attorney, Agent, or Firm* — ScienBiziP, P.C.

(57) ABSTRACT

Provided are an optical element that can achieve both color difference control and luminance reduction at an oblique viewing angle, and a liquid crystal display device including the optical element and having excellent display quality. The optical element includes: a first polarizer; a first phase difference layer; a second phase difference layer; and a second polarizer, the first polarizer, the first phase difference layer, the second phase difference layer, and the second polarizer being arranged in the stated order, the first phase difference layer satisfying the formula nx>ny≈nz, the second phase difference layer satisfying the formula nz>nx≈ny, the first polarizer and the second polarizer being linear polarizers, transmission axes of the first polarizer and the second polarizer being parallel to each other, a slow axis of the first phase difference layer being orthogonal to a polarization axis of the first polarizer.

11 Claims, 16 Drawing Sheets

OPTICAL ELEMENT AND LIQUID CRYSTAL DISPLAY DEVICE

CROSS-REFERENCE TO RELATED APPLICATIONS

The present application claims priority under 35 U.S.C. §119 to Japanese Patent Application No. 2022-085256 filed on May 25, 2022 and Japanese Patent Application No. 2022-187447 filed on Nov. 24, 2022, the contents of which are incorporated herein by reference in their entirety.

BACKGROUND OF THE INVENTION

Field of the Invention

The following disclosure relates to optical elements and liquid crystal display devices.

Description of Related Art

Liquid crystal display devices are display devices utilizing a liquid crystal material to display images. In a typical configuration thereof, a backlight is used as a light source and a liquid crystal panel including a liquid crystal layer is sandwiched between paired polarizers arranged in crossed Nicols. Such liquid crystal display devices are used in a variety of fields owing to their excellent display characteristics and advantageous features such as thin profile, light weight, and low power consumption.

A liquid crystal display device in a black display state sometimes possibly causes light leakage due to insufficient blocking of light emitted from a backlight toward the front surface of the device. In particular, in observation of the device in an oblique direction at an azimuthal angle of 45° relative to the polarization axis of a polarizer, light leakage is possibly significant. A main cause of the light leakage is presumably that the angle formed by the paired polarizers arranged in crossed Nicols across the liquid crystal panel appears greater than 90°.

A typical technique employed to reduce light leakage in observation in an oblique direction, i.e., light leakage at an oblique viewing angle, is to use a viewing angle compensation film to compensate for light leakage in an oblique direction and thus increase the viewing angle. Also, JP 2013-130882 A discloses a liquid crystal display device including a light source, a reflective linearly polarizing layer, a birefringent layer, an absorptive linearly polarizing layer whose transmission axis is substantially parallel to the transmission axis of the reflective linearly polarizing layer, a liquid crystal cell, a linearly polarizing layer, and a light diffusing layer in this order. This literature states that the birefringent layer among these members reduces light leakage in an oblique direction as the layer introduces a thickness direction retardation within a predetermined range and converts the polarization state of light incident in an oblique direction while substantially not converting the polarization state of light incident in the front direction.

BRIEF SUMMARY OF THE INVENTION

FIG. 26A and FIG. 26B are schematic cross-sectional views each showing a representative example of a conventional liquid crystal display device. Examples of such conventional liquid crystal display devices include a liquid crystal display device having a configuration in which, as shown in FIG. 26A, a liquid crystal panel 50 including a liquid crystal layer is sandwiched between a polarizer 60A and a polarizer 30B arranged in crossed Nicols; and a liquid crystal display device having a configuration in which, as shown in FIG. 26B, a liquid crystal panel 50 including a liquid crystal layer is sandwiched between a polarizer 60A and a polarizer 30B arranged in crossed Nicols, with a polarizer 30A further disposed in parallel Nicols with the polarizer 30B on a back surface side (backlight 10 side) of the polarizer 30B. In these configurations, light leakage is possibly significant in observation in an oblique direction as described above.

Although a technique of using a viewing angle compensation film is typically employed as described above to reduce light leakage at an oblique viewing angle, the light leakage reduction effect is considered still insufficient.

Another possible technique is to arrange a pair of polarizers in parallel Nicols on a back surface side (i.e., backlight side) of the liquid crystal panel with a phase difference layer between the polarizers. For example, a device disclosed in JP 2013-130882 A is an example of this technique. In this device, the polarization state of light emitted from the backlight and transmitted through the phase difference layer via one of the polarizers depends on the wavelength, so that the transmittance of light after transmitted through the other of the polarizers arranged in parallel Nicols depends on the wavelength. Thus, in observation of the liquid crystal display device at an azimuth easily influenced by the phase difference layer (e.g., azimuthal angle of 45°, a color difference (chromaticity difference) may occur to lead to insufficient display quality (see Comparative Examples 2 and 3 described below). There is thus still room for improvement in terms of achieving a reduction in transmittance (i.e., luminance) at an oblique viewing angle with the color difference controlled.

In response to the above issues, an object of the present invention is to provide an optical element that can achieve both color difference control and luminance reduction at an oblique viewing angle, and a liquid crystal display device including the optical element and having excellent display quality.

(1) One embodiment of the present invention is directed to an optical element including: a first polarizer; a first phase difference layer; a second phase difference layer; and a second polarizer, the first polarizer, the first phase difference layer, the second phase difference layer, and the second polarizer being arranged in the stated order, one of the first phase difference layer and the second phase difference layer satisfying the following formula (i) while the other of the first phase difference layer and the second phase difference layer satisfying the following formula (ii), or one of the first phase difference layer and the second phase difference layer satisfying the following formula (iii) while the other of the first phase difference layer and the second phase difference layer satisfying the following formula (iv), the first polarizer and the second polarizer being linear polarizers, a transmission axis of the first polarizer and a transmission axis of the second polarizer being parallel to each other, a slow axis of the first phase difference layer and the second phase difference layer, whichever satisfies the following formula (i) or (iii), being orthogonal to a polarization axis of the first polarizer, $$nx > ny \approx nz \quad \text{(i)}$$

$$nz > nx \approx ny \quad \text{(ii)}$$

$$ny < nx \approx nz \quad \text{(iii)}$$

$$nz < nx \approx ny \quad \text{(iv)}$$

wherein nx represents a principal refractive index in a slow axis direction in a plane of each of the phase difference layers; ny represents a principal refractive index in a fast axis direction in a plane of each phase difference layer; and nz represents a principal refractive index in a direction vertical to a surface of each phase difference layer.

(2) In an embodiment of the present invention, the optical element includes the structure (1), the first phase difference layer satisfies the formula (i), and the second phase difference layer satisfies the formula (ii).

(3) In an embodiment of the present invention, the optical element includes the structure (1) or (2), and an in-plane retardation Re (nm) introduced to light having a wavelength of 550 nm by the first phase difference layer or the second phase difference layer, whichever satisfies the formula (i) or (iii), and a thickness direction retardation Rth (nm) introduced to light having a wavelength of 550 nm by the first phase difference layer or the second phase difference layer, whichever satisfies the formula (ii) or (iv), satisfy the following formulas (1), (2), and (3):

$$Re \geq 0.47 \times Rth + 278 \quad (1)$$

$$Re \leq 1.29 \times Rth + 285 \quad (2)$$

$$Re \leq 0.54 \times Rth + 750 \quad (3).$$

(4) In an embodiment of the present invention, the optical element includes the structure (1) or (2), an in-plane retardation Re (nm) introduced to light having a wavelength of 550 nm by the first phase difference layer or the second phase difference layer, whichever satisfies the formula (i) or (iii), and a thickness direction retardation Rth (nm) introduced to light having a wavelength of 550 nm by the first phase difference layer or the second phase difference layer, whichever satisfies the formula (ii) or (iv), satisfy the following formulas (4), (5), and (6):

$$Re \geq 0.45 \times Rth + 320 \quad (4)$$

$$Re \leq 3.13 \times Rth - 490 \quad (5)$$

$$Re \leq -0.42 \times Rth + 644 \quad (6).$$

(5) In an embodiment of the present invention, the optical element includes the structure (1), (2), (3), or (4), and when the optical element is irradiated with light from a back surface side of the first polarizer, a transmittance T2 of oblique light transmitted at an azimuthal angle of 45° and a polar angle of 60° through the second polarizer is 40% or lower relative to a transmittance T1, taken as 100%, of the light transmitted through a configuration without the first phase difference layer or the second phase difference layer, and a color difference Δxy between an azimuthal angle of 0° and an azimuthal angle of 45° with the polar angle fixed at 60° is 0.005 or less.

(6) In an embodiment of the present invention, the optical element includes the structure (1), (2), (3), or (4), and when the optical element is irradiated with light from a back surface side of the first polarizer, a transmittance T2 of oblique light transmitted at an azimuthal angle of 45° and a polar angle of 60° through the second polarizer is 20% or lower relative to a transmittance T1, taken as 100%, of the light transmitted through a configuration without the first phase difference layer or the second phase difference layer, and a color difference Δxy between an azimuthal angle of 0° and an azimuthal angle of 45° with the polar angle fixed at 60° is 0.015 or less.

(7) In an embodiment of the present invention, the optical element includes the structure (6), and a thickness direction retardation Rth (nm) introduced by the first phase difference layer or the second phase difference layer, whichever satisfies the formula (ii) or (iv), is 500 nm or more.

(8) Another embodiment of the present invention is directed to a liquid crystal display device including: a liquid crystal panel; the optical element according to any one of (1) to (7) above; and a backlight, the liquid crystal panel, the optical element, and the backlight being arranged in the stated order from a viewing surface side, a first polarizer side surface of the optical element facing a viewing surface side of the backlight.

(9) In an embodiment of the present invention, the liquid crystal display device includes the structure (8) and further includes a third polarizer on a viewing surface side of the liquid crystal panel.

The present invention can provide an optical element that can achieve both color difference control and luminance reduction at an oblique viewing angle, and a liquid crystal display device including the optical element and having excellent display quality.

Figure 1:
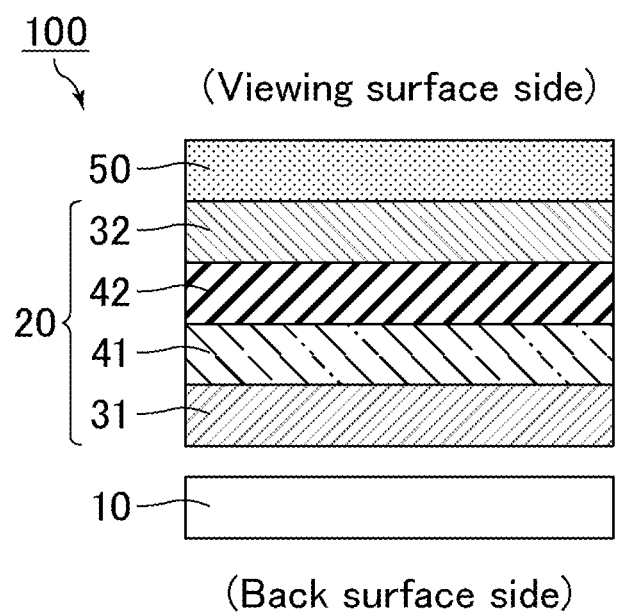
FIG. 1 is a schematic cross-sectional view of an example of a liquid crystal display device including an optical element according to Embodiments 1 and 3 to 5.

DETAILED DESCRIPTION OF THE INVENTION (Definition of terms)

The "viewing surface side" herein means the side closer to the screen (display surface) of the liquid crystal display device. The "back surface side" herein means the side farther from the screen (display surface) of the liquid crystal display device.

Herein, a "polarizer" means one having a function of filtering unpolarized light (natural light), partially polarized light, or polarized light into polarized light (linearly polarized light) vibrating only in a specific direction. Such a polarizer is distinctive from a circular polarizer. An "absorptive polarizer" means one having a function of absorbing light vibrating in a specific direction while transmitting polarized light (linearly polarized light) vibrating in a direction vertical to the specific direction. A "reflective polarizer" means one having a function of reflecting light vibrating in a specific direction while transmitting polarized light (linearly polarized light) vibrating in a direction vertical to the specific direction.

A phase difference layer means a layer that introduces at least one of an in-plane retardation (also referred to as an in-plane phase difference) Re or a thickness direction retardation (also referred to as a thickness direction phase difference) Rth of 10 nm or more, preferably 20 nm or more.

Herein, a value of Re or Rth is an absolute value.

The in-plane phase difference Re is defined by $Re=(nx-ny)\times d$.

The thickness direction phase difference Rth is defined by $Rth=\{nz-(nx+ny)/2\}\times d$.

An NZ factor (biaxial parameter) is defined by $NZ=(nx-nz)/(nx-ny)$, wherein $nx \geq ny$.

nx represents a principal refractive index in the slow axis direction in the plane of each phase difference layer.

ny represents a principal refractive index in the fast axis direction in the plane of each phase difference layer.

nz represents a principal refractive index in a direction vertical to a surface of each phase difference layer.

The slow axis direction is an azimuth where the refractive index is maximum. The fast axis direction is an azimuth where the refractive index is minimum. d represents the thickness of the phase difference layer.

A "half-wave plate" (also referred to as a $\lambda/2$ waveplate) means a phase difference plate that provides an in-plane phase difference of 1/2 of a wavelength to incident light having a wavelength $\lambda$.

A "$\lambda/4$ waveplate" means a phase difference plate that provides an in-plane phase difference of 1/4 of a wavelength to incident light having a wavelength $\lambda$.

The measurement wavelength for a principal refractive index, a phase difference, an NZ factor, and other optical parameters herein is 550 nm, unless otherwise specified.

The "polar angle $\theta$" herein means an angle formed by the direction in question (e.g., measurement direction) and the normal direction of a surface of the optical element or the screen of the liquid crystal panel.

The "azimuthal angle $\varphi$" herein means the direction in question in a view projected onto a surface of the optical element or the screen of the liquid crystal panel and is expressed as an angle (azimuthal angle) formed with the reference azimuth.

The reference azimuth ($\varphi=0°$) is set to the right in the horizontal direction of a surface of the optical element or the screen of the liquid crystal panel. The angle and the azimuthal angle each measure positive in the counterclockwise direction and measure negative in the clockwise direction. Both the counterclockwise and clockwise directions are rotational directions when a surface of the optical element or the screen of the liquid crystal panel is viewed from the viewer side (front). The angle is a value measured in a plan view of a surface of the optical element or the screen of the liquid crystal panel. The expression that two straight lines (including axes and directions) are "orthogonal" herein means that they are orthogonal in a plan view of a surface of the optical element or the screen of the liquid crystal panel.

The "axis azimuth" herein means, unless otherwise specified, the azimuth of the polarization axis of a polarizer or the slow axis of a phase difference layer. The polarization axis of a polarizer means an absorption axis in the case of an absorptive polarizer or a reflection axis in the case of a reflective polarizer. The slow axis of a phase difference layer means the in-plane slow axis.

Hereinafter, optical elements and liquid crystal display devices including the optical elements according to embodiments of the present invention are described. The present invention is not limited to the following embodiments. The design may be modified as appropriate within the range satisfying the configuration of the present invention.

(Embodiment 1)

FIG. 1 is a schematic cross-sectional view of an example of a liquid crystal display device including an optical element of the present embodiment. As shown in FIG. 1, a liquid crystal display device 100 includes a liquid crystal panel 50, an optical element 20, and a backlight 10 in this order from a viewing surface side. In other words, the liquid crystal display device 100 includes the backlight 10, the optical element 20, and the liquid crystal panel 50 in this order from a back surface side. The optical element 20 includes a first polarizer 31, a first phase difference layer 41, a second phase difference layer 42, and a second polarizer 32 in this order from a back surface side. In other words, in the liquid crystal display device 100, the first polarizer 31 side surface of the optical element 20 faces the viewing surface side of the backlight 10.

(Optical element)

The optical element 20 including the first polarizer 31, the first phase difference layer 41, the second phase difference layer 42, and the second polarizer 32 functions as an optical louver, and is thus also referred to as a polarizer louver. The optical element 20 is usually attached to the liquid crystal panel 50 with an adhesive layer (not shown).

The first polarizer 31 and the second polarizer 32 are arranged such that the transmission axis of the first polarizer 31 and the transmission axis of the second polarizer are parallel to each other. In other words, the first polarizer 31 and the second polarizer 32 are arranged in parallel Nicols. The expression "parallel to each other" means that the transmission axes form an angle falling within the range of 0°±10°, preferably within the range of 0°±5°.

The first polarizer 31 and the second polarizer 32 are linear polarizers. The first polarizer 31 is a polarizer designed for wavelength of light from the backlight 10. Light from the backlight 10 enters the first polarizer 31 and only linearly polarized waves vibrating along the polarization and transmission axis of the first polarizer 31 are transmitted through the first polarizer 31. The first polarizer 31 and the second polarizer 32 are also preferably absorptive polarizers, but can achieve the same effect even when they are reflective polarizers. For example, the first polarizer 31 and the second polarizer 32 may both be absorptive polarizers, or the first polarizer 31 may be a reflective polarizer while the second polarizer 32 may be an absorptive polarizer.

Specific examples of the absorptive polarizer include a polarizer obtained by adsorbing an anisotropic material such as an iodine complex (or a dye) on a polyvinyl alcohol film and aligning the material. Typically, each surface of the polyvinyl alcohol film is laminated with a protective film such as a triacetyl cellulose film for mechanical strength and moisture heat resistance in practical use. Specific examples of the reflective polarizer include a film including a stack of dielectric thin films, a film including a stack of thin films with different refractive indices, nanowire grid polarizers, and polarizers utilizing selective reflection by cholesteric liquid crystals.

The first polarizer 31 and the second polarizer 32 can each be set at an appropriate axis azimuth, and each are preferably set at an axis azimuth within the range of, for example, 0°±10° or 90°±10°, more preferably within the range of 0°±5° or 90°±5°, still more preferably substantially at 0° or 90°. This enables bright display in the normal direction and top-bottom and left-right directions.

The first phase difference layer 41 is disposed with its slow axis orthogonal to the polarization axis of the first polarizer 31. The term "orthogonal" means that the axes form an angle within the range of 90°±10°. The angle is preferably within the range of 90°±5°.

The first phase difference layer 41 satisfies the relationship nx>ny≈nz (formula (i) above). In other words, the first phase difference layer 41 is a uniaxial phase difference layer that satisfies the relationship nx>ny≈nz. The second phase difference layer 42 satisfies the relationship nz>nx≈ny (formula (ii) above). In other words, the second phase difference layer 42 is a uniaxial phase difference layer that satisfies the relationship nz>nx≈ny.

The sign "≈" means that the values are substantially equal to each other (also expressed as "approximately equal to each other").

As described above, the present embodiment relates to the optical element 20 including the first polarizer 31, the first phase difference layer 41, the second phase difference layer 42, and the second polarizer 32, the first polarizer 31, the first phase difference layer 41, the second phase difference layer 42, and the second polarizer 32 being arranged in this order, the first phase difference layer 41 satisfying the relationship nx>ny≈nz, the second phase difference layer 42 satisfying the relationship nz>nx≈ny, the first polarizer 31 and the second polarizer 32 being linear polarizers, the transmission axis of the first polarizer 31 and the transmission axis of the second polarizer 32 being parallel to each other, the slow axis of the first phase difference layer 41 being orthogonal to the polarization axis of the first polarizer 31.

As described above, light leakage at an oblique viewing angle can be reduced when the paired polarizers are arranged in parallel Nicols on the back surface side of the liquid crystal panel with a phase difference layer disposed between the polarizers. However, in observation of the liquid crystal display device at an azimuth easily influenced by the phase difference layer (e.g., azimuthal angle of 45°), a color difference possibly occurs to lower the display quality. In contrast, the present embodiment can achieve both luminance reduction and color difference control at an oblique viewing angle by employing a configuration in which the first phase difference layer 41 satisfying the relationship nx>ny≈nz and the second phase difference layer 42 satisfying the relationship nz>nx≈ny are stacked sequentially from the backlight 10 side between the pair of polarizers 31 and 32 arranged in parallel Nicols, and the first phase difference layer 41 is disposed with its slow axis orthogonal to the polarization axis of the first polarizer 31.

The first phase difference layer 41 may be formed from a single layer or two or more layers. A first phase difference layer 41 formed from two or more layers as a whole also satisfies the relationship nx>ny≈nz (formula (i)). Preferably, the first phase difference layer 41 as a whole satisfies the following preferred mode of a phase difference layer satisfying the formula (i).

A phase difference layer satisfying the formula (i) (the first phase difference layer 41 in the present embodiment) introduces an in-plane phase difference Re of 10 nm or more, preferably 20 nm or more, more preferably 100 nm or more, still more preferably 200 nm or more, particularly preferably 400 nm or more. The in-plane phase difference Re is preferably 1000 nm or less, more preferably 800 nm or less, still more preferably 600 nm or less.

The phase difference layer satisfying the formula (i) may be a positive A plate (also referred to as a "+A-plate").

The second phase difference layer 42 may be formed from a single layer or two or more layers. When the second phase difference layer 42 is formed from two or more layers, the second phase difference layer 42 as a whole also satisfies the relationship nz>nx≈ny (formula (ii)). Preferably, the second phase difference layer 42 as a whole satisfies the following preferred mode of a phase difference layer satisfying the formula (ii).

A phase difference layer satisfying the formula (ii) (the second phase difference layer 42 in the present embodiment) introduces a thickness direction phase difference Rth of 10 nm or more, preferably 20 nm or more, more preferably 50 nm or more, still more preferably 80 nm, particularly preferably 200 nm or more. The thickness direction phase difference Rth is preferably 1000 nm or less, more preferably 800 nm or less, still more preferably 600 nm or less.

The phase difference layer satisfying the formula (ii) may also exhibit positive wavelength dispersion. In the present invention, the phase difference layer exhibiting positive wavelength dispersion can also control the color difference.

When the phase difference layer exhibits positive wavelength dispersion, the ratio (R450/R550) of the thickness direction phase difference Rth at a wavelength of 450 nm to the thickness direction phase difference Rth at a wavelength of 550 nm is preferably 1.01 or higher and 1.20 or lower, more preferably 1.02 or higher and 1.18 or lower. The ratio (R650/R550) of the thickness direction phase difference Rth at a wavelength of 650 nm to the thickness direction phase difference Rth at a wavelength of 550 nm is preferably 0.80 or higher and 0.99 or lower, more preferably 0.90 or higher and or lower.

The phase difference layer satisfying the formula (ii) may be a positive C plate (also referred to as a "+C-plate"). Specific preferred examples include a film containing a material with a negative intrinsic birefringence as its component and having been subjected to vertical and transverse biaxial stretching, and a film to which a liquid crystalline material such as nematic liquid crystal has been applied. Examples of the material with a negative intrinsic birefringence include resin compositions such as acrylic resin and styrene resin, polystyrene, polyvinyl naphthalene, polyvinyl biphenyl, polyvinyl pyridine, polymethyl methacrylate, polymethyl acrylate, N-substituted maleimide copolymers, polycarbonate having a fluorene skeleton, and triacetyl cellulose (in particular, one with low degree of acetylation).

In the present embodiment, particularly suitable is a mode where the in-plane phase difference Re (nm) introduced by the first phase difference layer 41 to light having a wavelength of 550 nm and the thickness direction phase difference Rth (nm) introduced by the second phase difference layer 42 to light having a wavelength of 550 nm satisfy the following formulas (1), (2), and (3). This leads to a better color difference control effect and a better luminance reduction effect at an oblique viewing angle.

$$Re \geq 0.47 \times Rth + 278 \quad (1)$$

$$Re \leq 1.29 \times Rth + 285 \quad (2)$$

$$Re - 0.54 \times Rth + 750 \quad (3)$$

In particular, most suitable is a mode where the in-plane phase difference Re (nm) introduced by the first phase difference layer 41 and the thickness direction phase difference Rth (nm) introduced by the second phase difference layer 42 satisfy the following formulas (4), (5), and (6).

$$Re \geq 0.45 \times Rth + 320 \quad (4)$$

$$Re \leq 3.13 \times Rth - 490 \quad (5)$$

$$Re \leq -0.42 \times Rth + 644 \quad (6)$$

In the optical element 20, the first polarizer 31 and the first phase difference layer 41 are preferably adjacent to each other. The first phase difference layer 41 and the second phase difference layer 42 are also preferably adjacent to each other. In addition, the second phase difference layer 42 and the second polarizer 32 are preferably adjacent to each other. Particularly suitable is a mode where the first polarizer 31 and the first phase difference layer 41 are adjacent to each other, the first phase difference layer 41 and the second phase difference layer 42 are adjacent to each other, and the second phase difference layer 42 and the second polarizer 32 are adjacent to each other. In other words, no phase difference layer other than the first phase difference layer 41 and the second phase difference layer 42 is present between the first polarizer 31 and the second polarizer 32.

When the optical element 20 of the present embodiment light is irradiated with light from the back surface side of the first polarizer 31, a transmittance T2 of oblique light (azimuthal angle of 45°, polar angle of 60°) transmitted through the second polarizer 32 is preferably 80% or lower. Here, a transmittance of 100% corresponds to a transmittance T1 of oblique light (azimuthal angle of 45°, polar angle of) 60° transmitted through the second polarizer 32 when an optical element having a configuration without the first phase difference layer 41 or the second phase difference layer 42 is irradiated with light from the back surface side of the first polarizer 31. An optical element having a transmittance T2 of 80% or lower can be regarded as having a high light leakage reduction effect as a liquid crystal display device in practice. The transmittance T2 is more preferably 60% or lower, still more preferably 40% or lower, particularly preferably 20% or lower. The polar angle of oblique light may not be settable at 60° in some measuring devices. In such a case, the transmittances T2 and T1 are measured by setting the polar angle at 50°. Also in this case, the transmittance T2 is preferably within the above range.

The method of calculating and measuring the transmittances T2 and T1 are as described below. A suitable light source for calculation and measurement of a transmittance or the later-described color difference is a white light source having a flat luminance spectrum. Specifically, a white light source (CIE standard light source D65) is preferably used.

Also, a high front transmittance T0 of light (azimuthal angle of 45°, polar angle of 0°) transmitted through the second polarizer 32 is suitable when the optical element 20 is irradiated with light from the back surface side of the first polarizer 31. Specifically, for example, when an unpolarized light source is used, the front transmittance T0 is preferably 30% or higher, more preferably 40% or higher. The upper limit thereof is preferably 50% or lower.

When the optical element 20 of the present embodiment is irradiated with light from the back surface side of the first polarizer 31, the color difference Δxy between an azimuthal angle of 0° and an azimuthal angle of 45° with the polar angle fixed at 60° is preferably less than 0.025. With a color difference Δxy of less than 0.025, the optical element 20 can be regarded as having a small color difference at an oblique viewing angle as a liquid crystal display device in practice. The color difference Δxy is more preferably 0.015 or less, still more preferably 0.007 or less, particularly preferably 0.005 or less. The method of calculating and measuring the color difference Δxy is as described below.

In particular, suitable is an optical element 20 satisfying at least one of: (A) a mode where the transmittance T2 is 40% or lower and the Δxy is 0.005 or less; or (B) a mode where the transmittance T2 is 20% or lower and the Δxy is 0.015 or less. With such an optical element 20, a significantly high-performance liquid crystal display device can be obtained.

In the mode (B), the thickness direction phase difference Rth introduced by the second phase difference layer 42 is preferably 500 nm or more, more preferably 500 to 1000 nm, still more preferably 500 to 800 nm, particularly preferably 500 to 600 nm.

(Liquid crystal panel)

The configuration of the liquid crystal panel 50 is not limited. For example, the liquid crystal panel 50 may be a liquid crystal panel in which a liquid crystal layer is sandwiched between paired substrates one of which includes pixel electrodes and a common electrode, and voltage is applied between the pixel electrodes and the common electrode to generate a transverse electric field (including a fringe electric field) in the liquid crystal layer. The liquid crystal panel 50 may also be a liquid crystal panel in which a liquid crystal layer is sandwiched between paired substrates one of which includes pixel electrodes and the other of which includes a common electrode, and voltage is applied between the pixel electrodes and the common electrode to generate a vertical electric field in the liquid crystal layer. Specifically, examples of the transverse electric field mode include the fringe field switching (FFS) mode and the in plane switching (IPS) mode which align the liquid crystal molecules in the liquid crystal layer parallelly to a substrate surface with no voltage applied. Examples of the vertical electric field mode include the vertical alignment (VA) mode which aligns the liquid crystal molecules in the liquid crystal layer vertically to a substrate surface with no voltage applied.

The liquid crystal panel 50 may be in any liquid crystal mode, such as a mode of providing black display by aligning the liquid crystal molecules in the liquid crystal layer vertically to a substrate surface, or a mode of providing black display by aligning the liquid crystal molecules in the liquid crystal layer parallelly to a substrate surface or in a direction that is not vertical or parallel to a substrate surface. The liquid crystal panel 50 may be driven by the TFT method (active matrix method), the simple matrix method (passive matrix method), or the plasma address method.

(Backlight)

The backlight 10 may be any backlight configured to emit light, and may be a direct-lit backlight or an edge-lit backlight. Specifically, for example, the backlight 10 preferably includes a light source unit including a light guide and a light source, a reflection sheet, and a diffusion sheet. The light source may be, for example, a light emitting diode (LED).

(Other members)

The liquid crystal display device of the present embodiment has a configuration including, as well as the members described above, members including external circuits such as a tape-carrier package (TCP) and a printed circuit board (PCB); optical films such as a viewing angle-increasing film and a luminance-increasing film; and a bezel (frame). Some members may be incorporated into another member. Members other than those described above are not limited and are not described here because such members can be those commonly used in the field of liquid crystal display devices.

(Embodiment 2)

Features unique to the present embodiment are mainly described in the present embodiment, and contents already described in Embodiment 1 are omitted. Embodiment 2 shows a mode where the liquid crystal display device further includes a third polarizer 60 on the viewing surface side of the liquid crystal panel 50.

Figure 2:
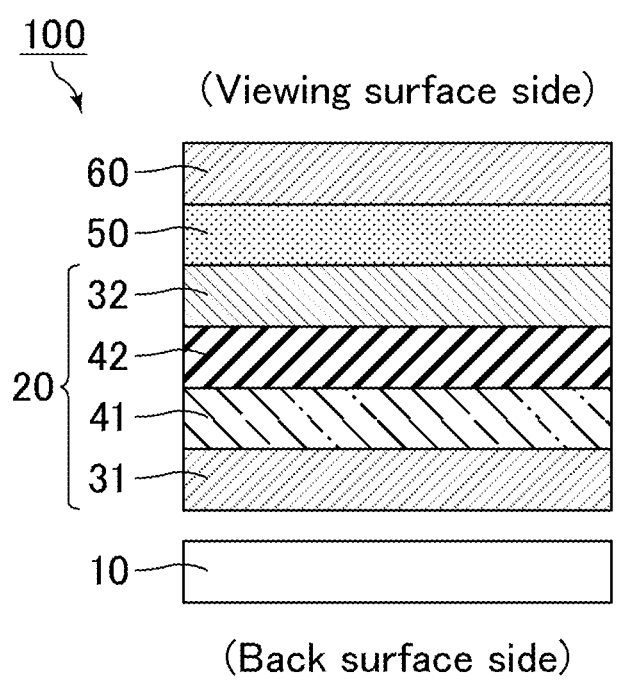
FIG. 2 is a schematic cross-sectional view showing an example of a liquid crystal display device including an optical element of Embodiment 2.

FIG. 2 is a schematic cross-sectional view showing an example of a liquid crystal display device including an optical element of the present embodiment. As shown in FIG. 2, the liquid crystal display device 100 includes the third polarizer 60, the liquid crystal panel 50, the optical element and the backlight 10 in this order from the viewing surface side. In other words, the liquid crystal display device 100 includes the backlight 10, the optical element 20, the liquid crystal panel 50, and the third polarizer 60 in this order from the back surface side. The optical element 20 includes the first polarizer 31, the first phase difference layer 41, the second phase difference layer 42, and the second polarizer 32 in this order from the back surface side.

The third polarizer 60 is preferably disposed with its transmission axis orthogonal to the transmission axis of the second polarizer 32. In other words, the third polarizer 60 is suitably disposed in crossed Nicols with the second polarizer 32. Also, the third polarizer 60 is preferably disposed with its transmission axis orthogonal to the transmission axis of the first polarizer 31. In other words, the third polarizer 60 is suitably disposed in crossed Nicols with the first polarizer 31. The expression "orthogonal to each other" means forming an angle within the range of 90°±10°. This angle is preferably within the range of 90°±5°.

The third polarizer 60 is preferably a linear polarizer and is suitably an absorptive polarizer but may be a reflective polarizer. Specific examples of the absorptive polarizer and the reflective polarizer are as described above.

(Embodiment 3)

Features unique to the present embodiment are mainly described in the present embodiment, and contents already described in Embodiment 1 are omitted. Embodiment 3 shows a mode where the first phase difference layer 41 is a phase difference layer satisfying the relationship nz>nx≈ny (formula (ii) above), and the second phase difference layer 42 is a phase difference layer satisfying the relationship nx>ny≈nz (formula (i) above).

FIG. 1 is also a schematic cross-sectional view of an example of a liquid crystal display device including an optical element of the present embodiment. As shown in FIG. 1, the liquid crystal display device 100 includes the liquid crystal panel 50, the optical element 20, and the backlight 10 in this order from the viewing surface side. In other words, the liquid crystal display device 100 includes the backlight the optical element 20, and the liquid crystal panel 50 in this order from the back surface side. The optical element 20 includes the first polarizer 31, the first phase difference layer 41, the second phase difference layer 42, and the second polarizer 32 in this order from the back surface side.

The first phase difference layer 41 satisfies the relationship nz>nx≈ny (formula (ii) above). In other words, the first phase difference layer 41 is a uniaxial phase difference layer satisfying the relationship nz>nx≈ny. The second phase difference layer 42 satisfies the relationship nx>ny≈nz (formula (i) above). In other words, the second phase difference layer 42 is a uniaxial phase difference layer satisfying the relationship nx>ny≈nz.

As described above, the present embodiment relates to the optical element 20 including the first polarizer 31, the first phase difference layer 41, the second phase difference layer 42, and the second polarizer 32, the first polarizer 31, the first phase difference layer 41, the second phase difference layer 42, and the second polarizer 32 being arranged in this order, the first phase difference layer 41 satisfying the relationship nz>nx≈ny, the second phase difference layer 42 satisfying the relationship nx>ny≈nz, the first polarizer 31 and the second polarizer 32 being linear polarizers, the transmission axis of the first polarizer 31 and the transmission axis of the second polarizer 32 being parallel to each other, the slow axis of the second phase difference layer 42 being orthogonal to the polarization axis of the first polarizer 31.

The optical element 20 can achieve both the luminance reduction and the color difference control at an oblique viewing angle when, as in the present embodiment, the first phase difference layer 41 satisfying the relationship nz>nx≈ny and the second phase difference layer 42 satisfying the relationship nx>ny≈nz are stacked in this order from the backlight 10 side between the paired polarizers 31 and 32 arranged in parallel Nicols, and the second phase difference layer 42 is disposed with its slow axis orthogonal to the polarization axis of the first polarizer 31.

The first phase difference layer 41 may be formed from a single layer or two or more layers. When the first phase difference layer 41 is formed from two or more layers, the first phase difference layer 41 as a whole satisfies the formula (ii). Preferably, the first phase difference layer 41 as a whole satisfies the above preferred mode of a phase difference layer satisfying the formula (ii).

The second phase difference layer 42 may be formed from a single layer or two or more layers. When the second phase difference layer 42 is formed from two or more layers, the second phase difference layer 42 as a whole satisfies the formula (i). Preferably, the second phase difference layer 42 as a whole satisfies the above preferred mode of a phase difference layer satisfying the formula (i).

In the present embodiment, particularly suitable is a mode where the in-plane phase difference Re (nm) introduced by the second phase difference layer 42 to light having a wavelength of 550 nm and the thickness direction phase difference Rth (nm) introduced by the first phase difference layer 41 to light having a wavelength of 550 nm satisfy the formulas (1), (2), and (3). In this mode, an even higher color difference control effect and an even higher luminance reduction effect at an oblique angle can be achieved. In particular, most suitable is a mode where the in-plane phase difference Re (nm) introduced by the second phase difference layer 42 and the thickness direction phase difference Rth (nm) introduced by the first phase difference layer 41 satisfy the formulas (4), (5), and (6).

Also in the present embodiment, particularly suitable is an optical element 20 satisfying at least one of: (A) a mode where the transmittance T2 is 40% or lower and the Δxy is 0.005 or less; or (B) a mode where the transmittance T2 is 20% or lower and the Δxy is 0.015 or less. In the mode (B), the thickness direction phase difference Rth introduced by the first phase difference layer 41 is preferably 500 nm or more, more preferably 500 to 1000 nm, still more preferably 500 to 800 nm, particularly preferably 500 to 600 nm.

(Embodiment 4)

Features unique to the present embodiment are mainly described in the present embodiment, and contents already described in Embodiment 1 are omitted. Embodiment 4 shows a mode where the first phase difference layer 41 is a phase difference layer satisfying the relationship ny<nx≈nz (formula (iii) above), and the second phase difference layer 42 satisfies the relationship nz<nx≈ny (formula (iv) above).

FIG. 1 is also a schematic cross-sectional view of an example of a liquid crystal display device including an optical element of the present embodiment. As shown in FIG. 1, the liquid crystal display device 100 includes the liquid crystal panel 50, the optical element 20, and the backlight 10 in this order from the viewing surface side. In other words, the liquid crystal display device 100 includes the backlight the optical element 20, and the liquid crystal panel 50 in this order from the back surface side. The optical element 20 includes the first polarizer 31, the first phase difference layer 41, the second phase difference layer 42, and the second polarizer 32 in this order from the back surface side.

The first phase difference layer 41 satisfies the relationship ny<nx≈nz (formula (iii) above). In other words, the first phase difference layer 41 is a uniaxial phase difference layer satisfying the relationship ny<nx≈nz. The second phase difference layer 42 satisfies the relationship nz<nx≈ny (formula (iv) above). In other words, the second phase difference layer 42 is a uniaxial phase difference layer satisfying the relationship nz<nx≈ny.

As described above, the present embodiment relates to the optical element 20 including the first polarizer 31, the first phase difference layer 41, the second phase difference layer 42, and the second polarizer 32, the first polarizer 31, the first phase difference layer 41, the second phase difference layer 42, and the second polarizer 32 being arranged in this order, the first phase difference layer 41 satisfying the relationship ny<nx≈nz, the second phase difference layer 42 satisfying the relationship nz<nx≈ny, the first polarizer 31 and the second polarizer 32 being linear polarizers, the transmission axis of the first polarizer 31 and the transmission axis of the second polarizer 32 being parallel to each other, the slow axis of the first phase difference layer 41 being orthogonal to the polarization axis of the first polarizer 31.

The optical element 20 can achieve both the luminance reduction and the color difference control at an oblique viewing angle when, as in the present embodiment, the first phase difference layer 41 satisfying the relationship ny<nx≈nz and the second phase difference layer 42 satisfying the relationship nz<nx≈ny are stacked in this order from the backlight 10 side between the paired polarizers 31 and 32 arranged in parallel Nicols, and the first phase difference layer 41 is disposed with its slow axis orthogonal to the polarization axis of the first polarizer 31.

The first phase difference layer 41 may be formed from a single layer or two or more layers. When the first phase difference layer 41 is formed from two or more layers, the first phase difference layer 41 as a whole satisfies the relationship ny<nx≈nz (formula (iii)). Preferably, the first phase difference layer 41 as a whole satisfies the following preferred mode of a phase difference layer satisfying the formula (iii).

A phase difference layer satisfying the formula (iii) (the first phase difference layer 41 in the present embodiment) introduces an in-plane phase difference Re (absolute value) of 10 nm or more, preferably 20 nm or more, more preferably 100 nm or more, still more preferably 200 nm or more, particularly preferably 400 nm or more. The in-plane phase difference Re is preferably 1000 nm or less, more preferably 800 nm or less, still more preferably 600 nm or less.

The phase difference layer satisfying the formula (iii) may be a negative A plate (also referred to as a "−A-plate").

The second phase difference layer 42 may be formed from a single layer or two or more layers. When the second phase difference layer 42 is formed from two or more layers, the second phase difference layer 42 as a whole satisfies the relationship nz<nx≈ny (formula (iv)). Preferably, the second phase difference layer 42 as a whole satisfies the following preferred mode of a phase difference layer satisfying the formula (iv).

A phase difference layer satisfying the formula (iv) (the second phase difference layer 42 in the present embodiment) introduces a thickness direction phase difference Rth (absolute value) of 10 nm or more, preferably 20 nm or more, more preferably 50 nm or more, still more preferably 80 nm or more, particularly preferably 200 nm or more. The thickness direction phase difference Rth is preferably 1000 nm or less, more preferably 800 nm or less, still more preferably 600 nm or less.

The phase difference layer satisfying the formula (iv) may also exhibit positive wavelength dispersion. In the present invention, the phase difference layer exhibiting positive wavelength dispersion can also control the color difference. When the phase difference layer exhibits positive wavelength dispersion, the ratio (R450/R550) of the thickness direction phase difference Rth at a wavelength of 450 nm to the thickness direction phase difference Rth at a wavelength of 550 nm is preferably 1.01 or higher and 1.20 or lower, more preferably 1.02 or higher and 1.18 or lower. The ratio (R650/R550) of the thickness direction phase difference Rth at a wavelength of 650 nm to the thickness direction phase difference Rth at a wavelength of 550 nm is preferably 0.80 or higher and 0.99 or lower, more preferably 0.90 or higher and or lower.

The phase difference layer satisfying the formula (iv) may be a positive C plate (also referred to as a "+C-plate").

Also in the present embodiment, particularly suitable is a mode where the in-plane phase difference Re (nm) introduced by the first phase difference layer 41 to light having a wavelength of 550 nm and the thickness direction phase difference Rth (nm) introduced by the second phase difference layer 42 to light having a wavelength of 550 nm satisfy the formulas (1), (2), and (3). This leads to a better color difference control effect and a better luminance reduction effect at an oblique viewing angle. In particular, most suitable is a mode where the in-plane phase difference Re (nm) introduced by the first phase difference layer 41 and the thickness direction phase difference Rth (nm) introduced by the second phase difference layer 42 satisfy the formulas (4), (5), and (6).

Also in the present embodiment, particularly suitable is an optical element 20 satisfying at least one of: (A) a mode where the transmittance T2 is 40% or lower and the Δxy is or less; or (B) a mode where the transmittance T2 is 20% or lower and the Δxy is 0.015 or less. In the mode (B), the thickness direction phase difference Rth (absolute value) introduced by the second phase difference layer 42 is preferably 500 nm or more, more preferably 500 to 1000 nm, still more preferably 500 to 800 nm, particularly preferably 500 to 600 nm.

(Embodiment 5)

Features unique to the present embodiment are mainly described in the present embodiment, and contents already described in Embodiment 1 are omitted. Embodiment 5 shows a mode where the first phase difference layer 41 is a phase difference layer satisfying the relationship nz<nx≈ny (formula (iv) above), and the second phase difference layer 42 is a phase difference layer satisfying the relationship ny<nx≈nz (formula (iii) above).

FIG. 1 is also a schematic cross-sectional view of an example of a liquid crystal display device including an optical element of the present embodiment. As shown in FIG. 1, the liquid crystal display device 100 includes the liquid crystal panel 50, the optical element 20, and the backlight 10 in this order from the viewing surface side. In other words, the liquid crystal display device 100 includes the backlight the optical element 20, and the liquid crystal panel 50 in this order from the back surface side. The optical element 20 includes the first polarizer 31, the first phase difference layer 41, the second phase difference layer 42, and the second polarizer 32 in this order from the back surface side.

The first phase difference layer 41 satisfies the relationship nz<nx≈ny (formula (iv) above). In other words, the first phase difference layer 41 is a uniaxial phase difference layer satisfying the relationship nz<nx≈ny. The second phase difference layer 42 satisfies the relationship ny<nx≈nz (formula (iii) above). In other words, the second phase difference layer 42 is a uniaxial phase difference layer satisfying the relationship ny<nx≈nz.

As described above, the present embodiment relates to the optical element 20 including the first polarizer 31, the first phase difference layer 41, the second phase difference layer 42, and the second polarizer 32, the first polarizer 31, the first phase difference layer 41, the second phase difference layer 42, and the second polarizer 32 being arranged in this order, the first phase difference layer 41 satisfying the relationship nz<nx≈ny, the second phase difference layer 42 satisfying the relationship ny<nx≈nz, the first polarizer 31 and the second polarizer 32 being linear polarizers, the transmission axis of the first polarizer 31 and the transmission axis of the second polarizer 32 being parallel to each other, the slow axis of the second phase difference layer 42 being orthogonal to the polarization axis of the first polarizer 31.

The optical element 20 can achieve both the luminance reduction and the color difference control at an oblique viewing angle when, as in the present embodiment, the first phase difference layer 41 satisfying the relationship nz<nx≈ny and the second phase difference layer 42 satisfying the relationship ny<nx≈nz are stacked in this order from the backlight 10 side between the paired polarizers 31 and 32 arranged in parallel Nicols, and the second phase difference layer 42 is disposed with its slow axis orthogonal to the polarization axis of the first polarizer 31.

The first phase difference layer 41 may be formed from a single layer or two or more layers. When the first phase difference layer 41 is formed from two or more layers, the first phase difference layer 41 as a whole satisfies the formula (iv). Preferably, the first phase difference layer 41 as a whole satisfies the above preferred mode of a phase difference layer satisfying the formula (iv).

The second phase difference layer 42 may be formed from a single layer or two or more layers. When the second phase difference layer 42 is formed from two or more layers, the second phase difference layer 42 as a whole satisfies the formula (iii). Preferably, the second phase difference layer 42 as a whole satisfies the above preferred mode of a phase difference layer satisfying the formula (iii).

In the present embodiment, particularly suitable is a mode where the in-plane phase difference Re (nm) introduced by the second phase difference layer 42 to light having a wavelength of 550 nm and the thickness direction phase difference Rth (nm) introduced by the first phase difference layer 41 to light having a wavelength of 550 nm satisfy the formulas (1), (2), and (3). This leads to an even better color difference control effect and an even better luminance reduction effect at an oblique viewing angle. In particular, most suitable is a mode where the in-plane phase difference Re (nm) introduced by the second phase difference layer 42 and the thickness direction phase difference Rth (nm) introduced by the first phase difference layer 41 satisfy the formulas (4), (5), and (6).

Also in the present embodiment, particularly suitable is an optical element 20 satisfying at least one of: (A) a mode where the transmittance T2 is 40% or lower and the Δxy is or less; or (B) a mode where the transmittance T2 is 20% or lower and the Δxy is 0.015 or less. In the mode (B), the thickness direction phase difference Rth (absolute value) introduced by the first phase difference layer 41 is preferably 500 nm or more, more preferably 500 to 1000 nm, still more preferably 500 to 800 nm, particularly preferably 500 to 600 nm.

EXAMPLES

Hereinafter, the present invention is described in more detail with reference to examples and comparative examples. The present invention is not limited to these examples.

In schematic cross-sectional views of FIG. 5A to FIG. 20 and FIG. 22 to FIG. 25, the angle shown at the right of each layer means an azimuthal angle of the absorption axis for an absorptive polarizer, the azimuthal angle of the reflection axis for a reflective polarizer, or the azimuthal angle of the in-plane slow axis for a phase difference layer.

(Evaluation test)

In the following examples, a light leakage reduction effect and a color difference in observation in an oblique direction at an azimuthal angle of 45° and a polar angle of 60°, i.e., at an oblique viewing angle, were evaluated. The evaluation methods are described below.

In the evaluation tests, a white light source (CIE standard light source D65) was used as the backlight light source. Specifically, in Example 13, the transmittance was measured with the variable wavelength light source in "AxoScan" available from Opto Science, Inc. (in particular, available from Axometrics, Inc.), and then the chromaticity was measured with the white light source in "GC5000" available from Nippon Denshoku Industries Co., Ltd.).

In Comparative Examples 1 to 3, the evaluation was performed by varying the in-plane phase difference Re or thickness direction phase difference Rth introduced by a phase difference layer 40 within the range of 60 to 450 nm. With consideration given to the possibility that the wavelength dispersion exhibited by the phase difference layer slightly affects the simulation results, in Comparative Examples 1 to 3 and Examples 1 to 12, 14, and 15, the +A-plate was one exhibiting flat wavelength dispersion assuming use of a cycloolefin polymer (COP) film, while the +C-plate was one exhibiting typical positive wavelength dispersion.

Members other than the optical element 20 (e.g., the liquid crystal panel 50 and the third polarizer 60) do not significantly affect the physical properties evaluated below. Thus, when the optical element 20 has both the light leakage reduction effect and the color difference control effect, a liquid crystal display device including the optical element 20 can be determined to be able to achieve the same effects.

(1) Light leakage reduction effect

Figure 3A:
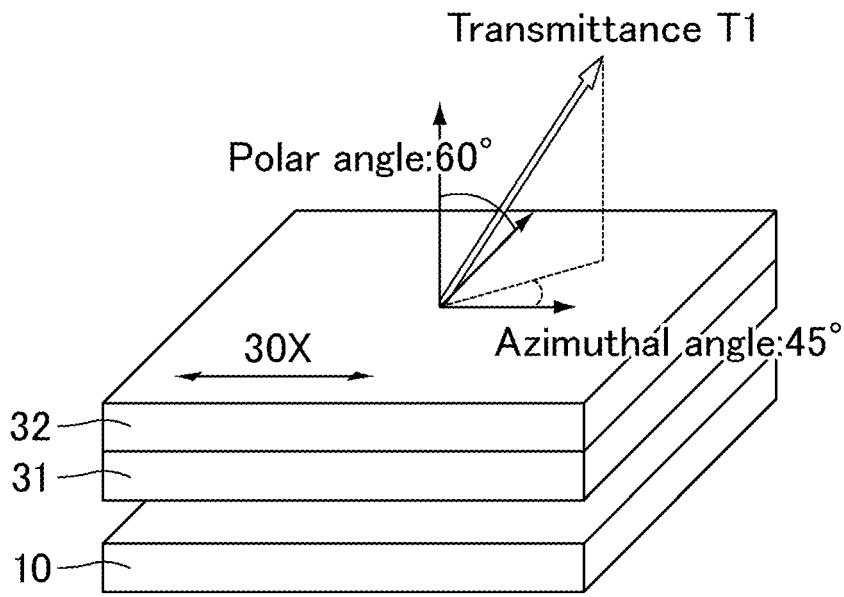
FIG. 3A is a view for describing a method of evaluating the light leakage reduction effect.
Figure 3B:
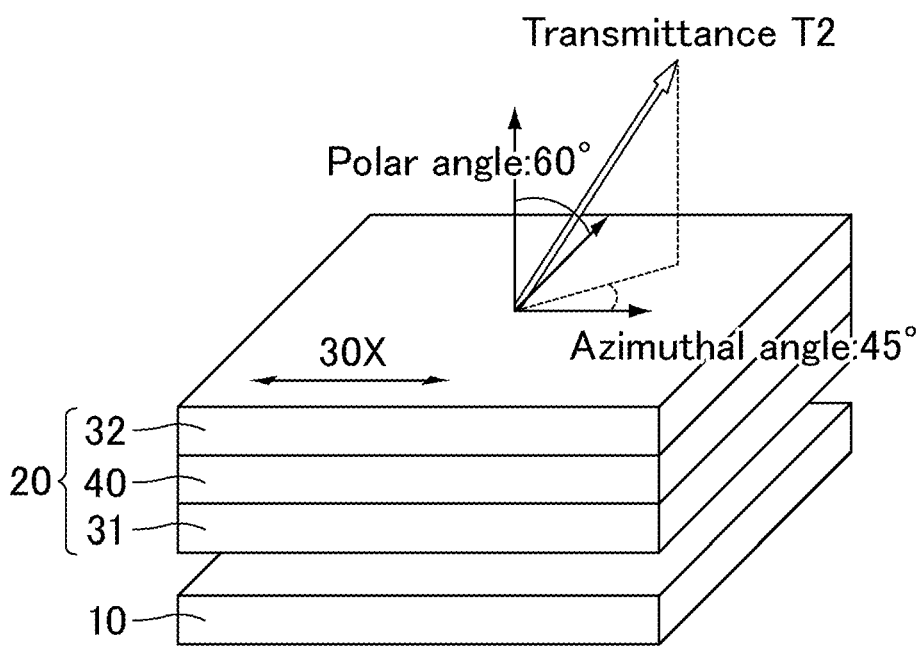
FIG. 3B is another view for describing the method of evaluating the light leakage reduction effect.

FIG. 3A and FIG. 3B each are a view for describing a method of evaluating the light leakage reduction effect.

As shown in FIG. 3B, the optical element 20 is irradiated with light emitted from the backlight 10 on the back surface side. The optical element 20 is subjected to measurement of transmittance of oblique light (azimuthal angle of 45°, polar angle of 60° transmitted through the second polarizer 32 defining the viewing surface side outermost surface of the optical element 20. The measured transmittance is taken as "transmittance T2". The optical element 20 here includes the phase difference layer 40 between the paired polarizers 31 and 32, and the phase difference layer 40 may be formed from two or more layers (e.g., phase difference layers 41 and 42) (the same applies to FIG. 4). Separately, as shown in FIG. 3A, an optical element 20 having a configuration without the phase difference layer 40 is also subjected to measurement of transmittance of oblique light (azimuthal angle of 45°, polar angle of 60°) transmitted through the second polarizer 32. The measured transmittance is taken as "transmittance T1".

The transmittance T2 relative to the transmittance T1 taken as 100%, i.e., a value calculated from "(transmittance T2/transmittance T1)×100", is set as the index of the light leakage reduction effect.

In Comparative Examples 1 to 3 and Examples 1 to 12 and 14 to 17, the transmittances T1 and T2 were determined by calculation using the liquid crystal simulator "LCD Master" available from Shintech Inc.

In Example 13, the transmittances T2 and T1 were actually measured with "AxoScan" available from Opto Science, Inc. (in particular, available from Axometrics, Inc.) (due to measurement device constraints, the polar angle of oblique light was set at 50°).

(2) Color difference

Figure 4:
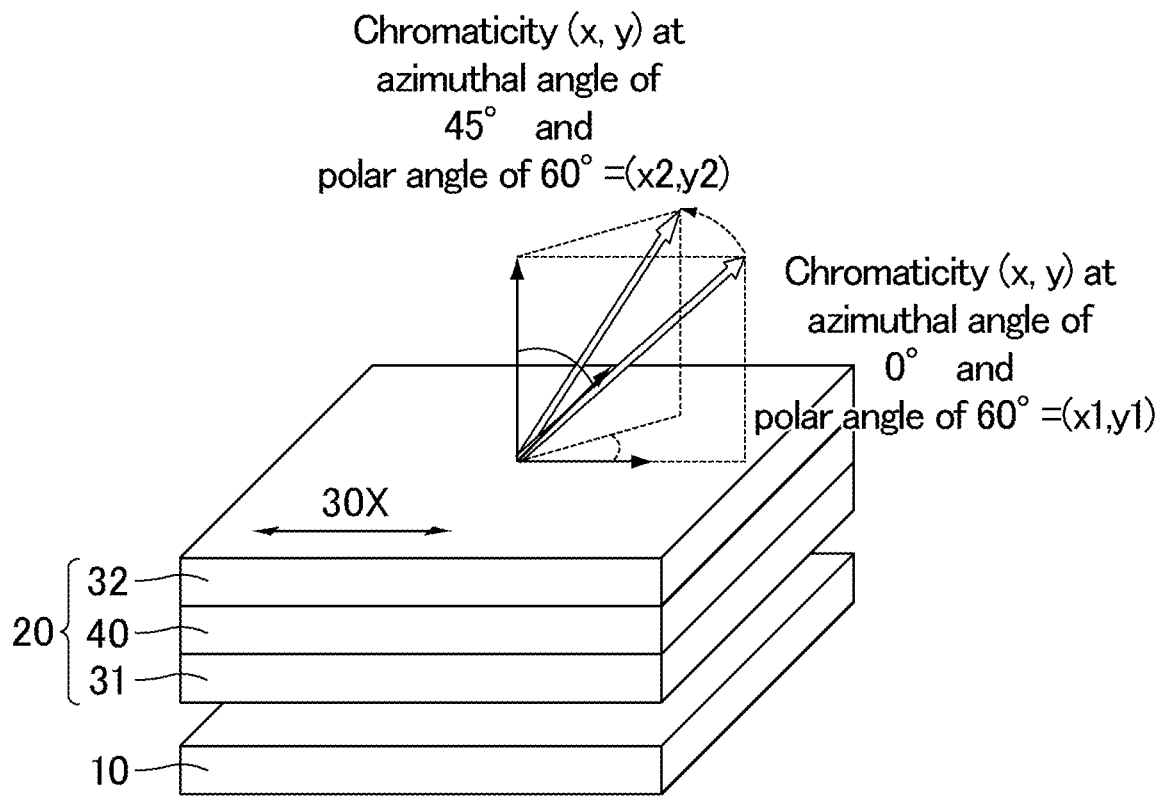
FIG. 4 is a view for describing a method of evaluating a color difference.

FIG. 4 is a view for describing a method of evaluating a color difference.

As shown in FIG. 4, the optical element 20 is irradiated with light emitted from the backlight 10 on the back surface side. The optical element 20 is subjected to measurement of chromaticity $(x, y)=(x_1, y_1)$ at an azimuthal angle of 0° with the polar angle fixed at 60°. The optical element 20 is also subjected to measurement of chromaticity $(x, y)=(x_2, y_2)$ at an azimuthal angle of 45° with the polar angle fixed at 60°. Based on these chromaticity values, the color difference Δxy is calculated from the following formula (7):

$$\Delta xy=\{(x_1-x_2)\times 2+(y_1-y_2)\times 2\}/2 \qquad (7).$$

In Comparative Examples 1 to 3 and Examples 1 to 12 and 14 to 17, the chromaticity was determined by calculation using the liquid crystal simulator "LCD Master" available from Shintech Inc.

In Example 13, the chromaticity was actually measured with "GC5000" available from Nippon Denshoku Industries Co., Ltd.

(Comparative Example 1)

Figure 5A:
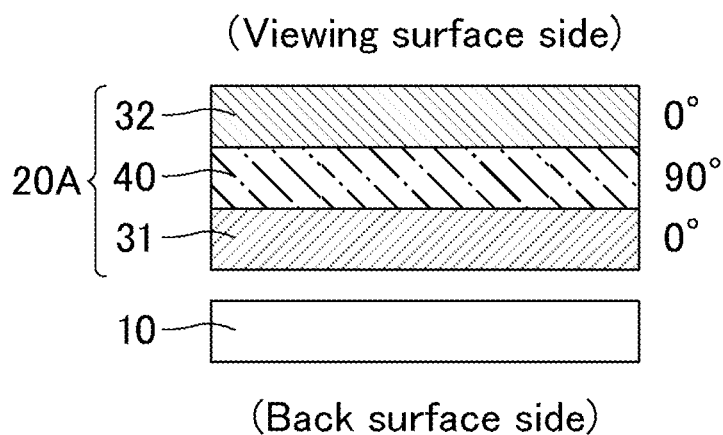
FIG. 5A is a schematic cross-sectional view of an optical element 20A of Comparative Example 1.

An optical element 20A of Comparative Example 1 includes, as shown in FIG. 5A, a first polarizer 31, a phase difference layer 40 whose slow axis is orthogonal to an absorption axis of the first polarizer 31, and a second polarizer 32 disposed in parallel Nicols with the first polarizer 31 in this order from the back surface side (backlight 10 side). The phase difference layer 40 was a +A-plate. The first and second polarizers 31 and 32 were absorptive polarizers. FIG. 5A is a schematic cross-sectional view of an optical element 20A of Comparative Example 1.

Figure 5B:
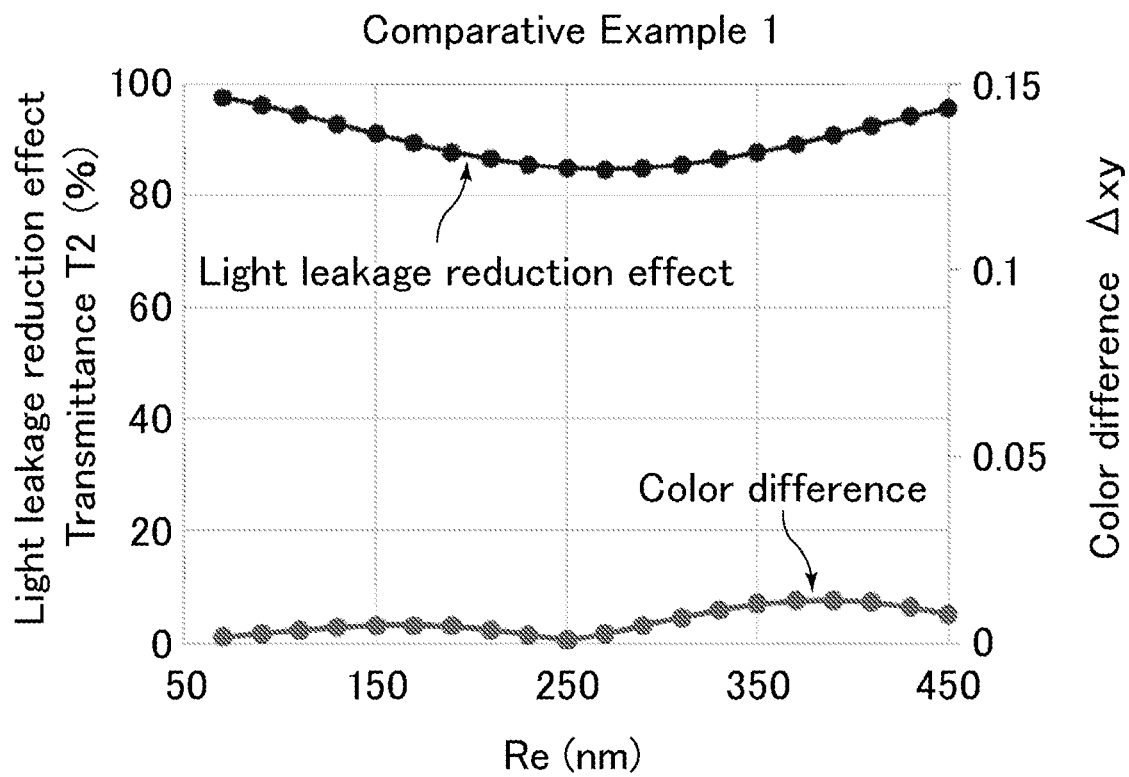
FIG. 5B shows the evaluation results of Comparative Example 1.

The light leakage reduction effect and color difference in an oblique direction of the optical element 20A of Comparative Example 1 were evaluated by the above methods. The results are shown in FIG. 5B. FIG. 5B shows the evaluation results of Comparative Example 1. The horizontal axis represents in-plane phase difference Re (nm) introduced by the phase difference layer 40 (+A-plate). The vertical axis of the light leakage reduction effect graph represents T2 (%) relative to T1 taken as 100%. The vertical axis of the color difference graph represents color difference Δxy. FIG. 5B shows that the color difference is minimum when the in-plane phase difference Re introduced by the phase difference layer 40 (+A-plate) is 250 nm, with a Δxy value of 0.001. This design value (Re=250 nm), at which the color difference is minimum, resulted in a light leakage reduction effect (i.e., T2 relative to T1 taken as 100%) of 85%, which is insufficient.

(Comparative Example 2)

Figure 6A:
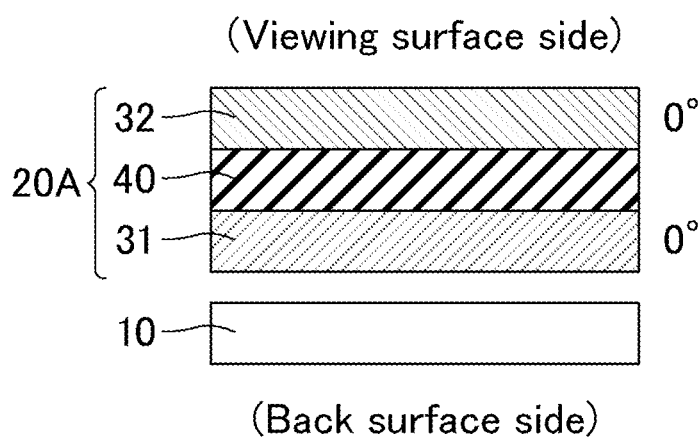
FIG. 6A is a schematic cross-sectional view of an optical element 20A of Comparative Example 2.

An optical element 20A of Comparative Example 2 has the same configuration as the optical element 20A of Comparative Example 1, except that the phase difference layer 40 was a +C-plate. FIG. 6A is a schematic cross-sectional view of the optical element 20A of Comparative Example 2.

Figure 6B:
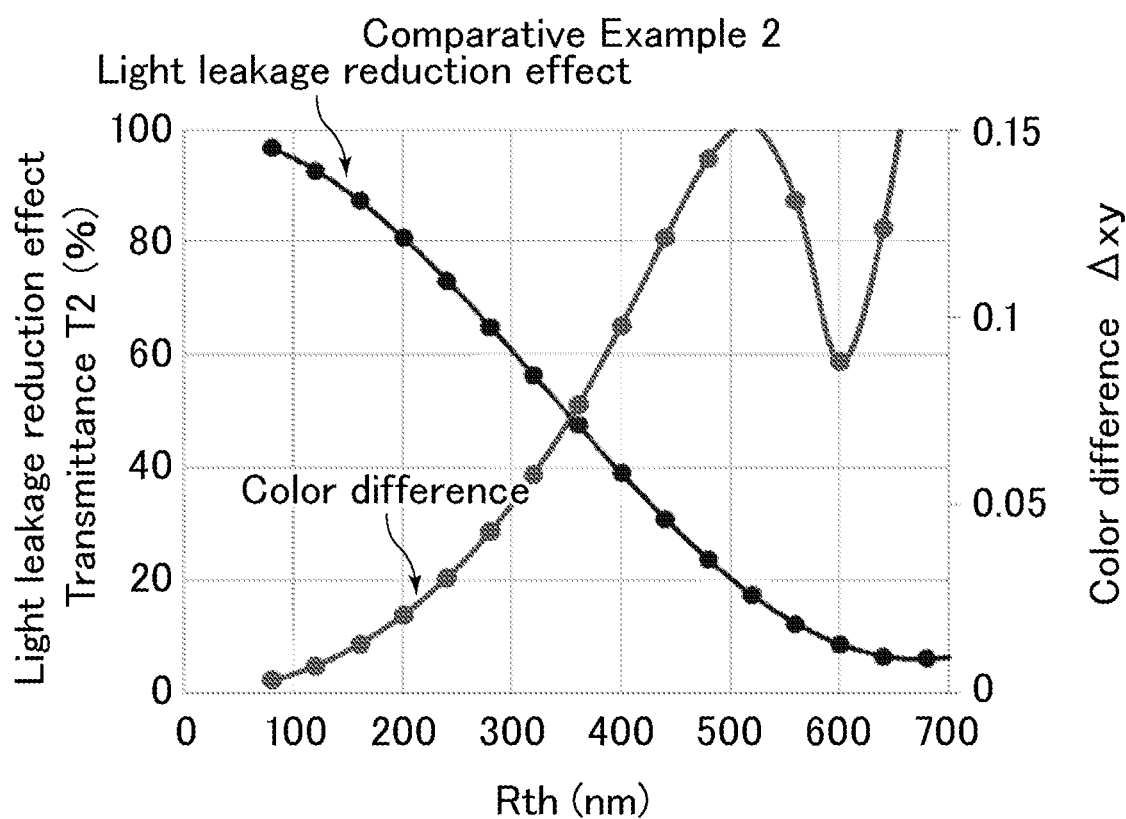
FIG. 6B shows the evaluation results of Comparative Example 2.

The light leakage reduction effect and color difference in an oblique direction of the optical element 20A of Comparative Example 2 were evaluated by the above methods. The results are shown in FIG. 6B. FIG. 6B shows the evaluation results of Comparative Example 2. The horizontal axis represents thickness direction phase difference Rth (nm) introduced by the phase difference layer 40 (+C-plate). The vertical axis of the light leakage reduction effect graph represents T2 (%) relative to T1 taken as 100%. The vertical axis of the color difference graph represents color difference Δxy. FIG. 6B shows that the color difference is minimum when the thickness direction phase difference Rth introduced by the phase difference layer 40 (+C-plate) is 600 nm, with a Δxy value as large as 0.088. In this case, the liquid crystal display device fails to have excellent display quality. This design value (Rth=600 nm), at which the color difference is minimum, resulted in a light leakage reduction effect of 9%.

(Comparative Example 3)

Figure 7A:
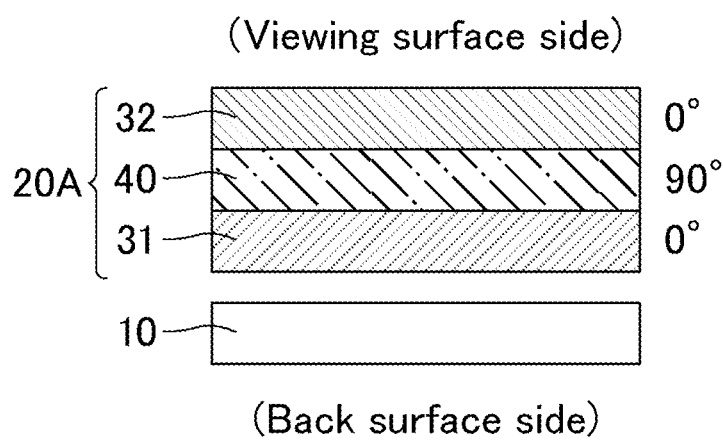
FIG. 7A is a schematic cross-sectional view of an optical element 20A of Comparative Example 3.

An optical element 20A of Comparative Example 3 has the same configuration as the optical element 20A of Comparative Example 1, except that the phase difference layer 40 was a biaxial phase difference plate having an NZ=−9.5. FIG. 7A is a schematic cross-sectional view of the optical element 20A of Comparative Example 3. The design value selected for Comparative Example 3 was a value of a configuration having a small color difference and a large light leakage reduction effect, among the configurations disclosed in JP 2013-130882 A.

Figure 7B:
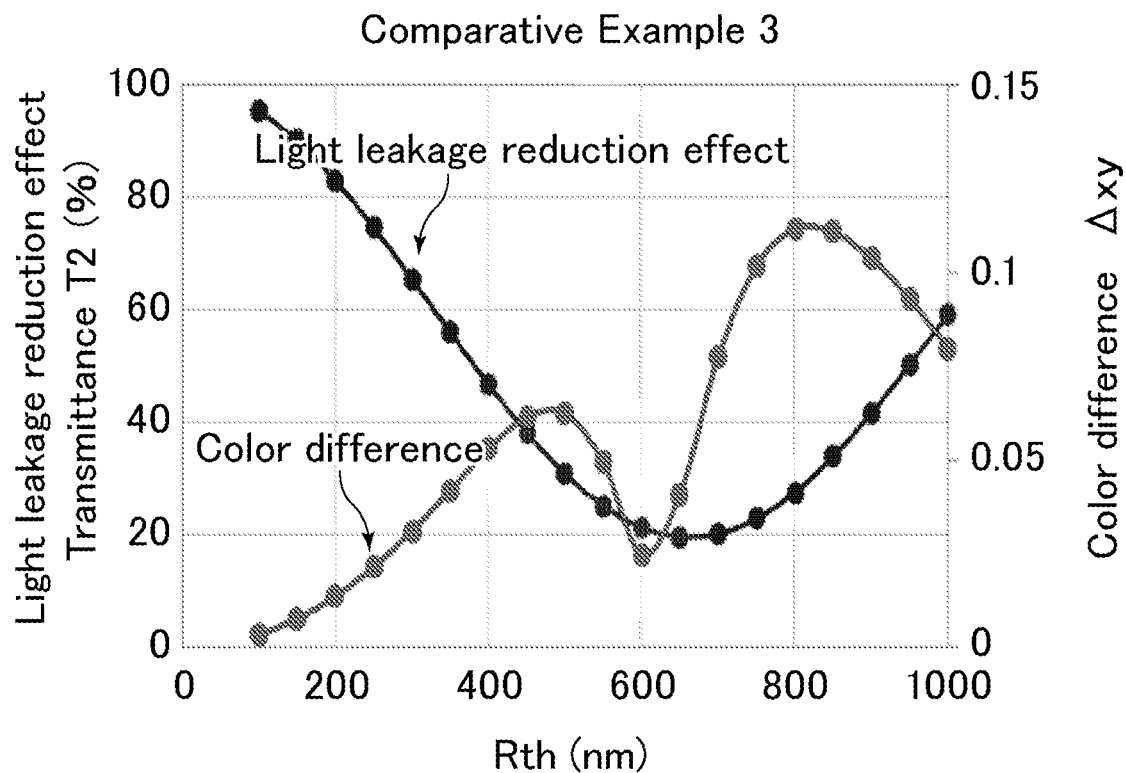
FIG. 7B shows the evaluation results of Comparative Example 3.

The light leakage reduction effect and color difference in an oblique direction of the optical element 20A of Comparative Example 3 were evaluated by the above methods. The results are shown in FIG. 7B. FIG. 7B shows the evaluation results of Comparative Example 3. The horizontal axis represents thickness direction phase difference Rth (nm) introduced by the phase difference layer 40 (biaxial phase difference plate). The vertical axis of the light leakage reduction effect graph represents T2 (%) relative to T1 taken as 100%. The vertical axis of the color difference graph represents color difference Δxy. FIG. 7B shows that the color difference is minimum when the thickness direction phase difference Rth introduced by the phase difference layer 40 (biaxial phase difference plate) is 600 nm, with a Δxy value as large as 0.025. Also in this case, the liquid crystal display device fails to have excellent display quality. This design value (Rth=600 nm), at which the color difference is minimum, resulted in a light leakage reduction effect of 21%.

(Example 1)

Figure 8:
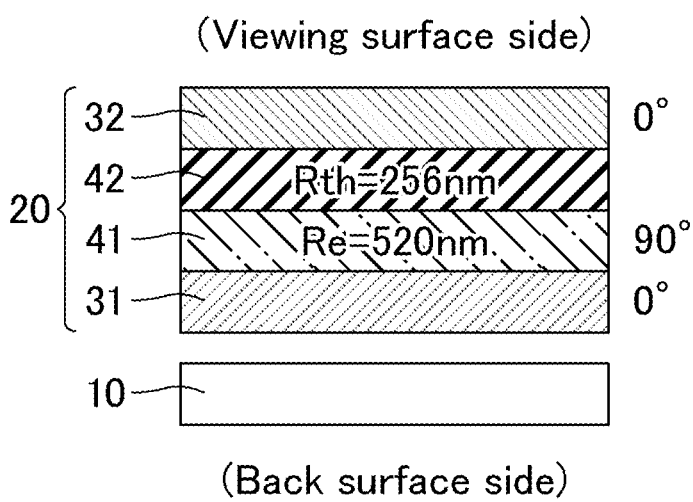
FIG. 8 is a schematic cross-sectional view of an optical element 20 of Example 1.

An optical element 20 of Example 1 includes, as shown in FIG. 8, a first polarizer 31, a first phase difference layer 41 whose slow axis is orthogonal to an absorption axis of the first polarizer 31, a second phase difference layer 42, and a second polarizer 32 disposed in parallel Nicols with the first polarizer 31 in this order from the back surface side (backlight 10 side). The first phase difference layer 41 was a +A-plate. The second phase difference layer 42 was a +C-plate. The first and second polarizers 31 and 32 were absorptive polarizers. FIG. 8 is a schematic cross-sectional view of the optical element 20 of Example 1.

Here, the in-plane phase difference Re introduced by the first phase difference layer 41 was set to 520 nm, and the thickness direction phase difference Rth introduced by the second phase difference layer 42 was set to 256 nm. The second phase difference layer 42 introducing the thickness direction phase difference Rth was set to exhibit positive wavelength dispersion, and the thickness direction phase difference Rth introduced at a wavelength λ, represented by "R(λ)", was set to satisfy the following formulas (8) and (9).

$$R(450\ nm)/R(550\ nm)=1.05 \quad (8)$$

$$R(650\ nm)/R(550\ nm)=0.97 \quad (9)$$

Also in Examples 2 to 13 described below, the second phase difference layer 42 introducing the thickness direction phase difference Rth was set to exhibit positive wavelength dispersion, and the R(λ) was set to satisfy the formulas (8) and (9).

The light leakage reduction effect and color difference at an oblique viewing angle of the optical element 20 of Example 1 were evaluated by the above methods. Table 1 shows the results. The Rth in Table 1 represents the thickness direction phase difference introduced at a wavelength of 550 nm, and the same applies to Table 2 to Table 13 described below. Table 1 also shows, for comparison, the in-plane phase difference Re introduced by the phase difference layer 40 when the color difference is minimum in Comparative Example 1 and the evaluation results of Comparative Example 1. Table 2 to Table 11 also show these values.

TABLE 1

|  | Comparative Example 1 | Example 1 |
|---|---|---|
| Rth (+C-plate) |  | 256 nm |
| Re (+A-plate) | 250 nm | 520 nm |
| Color difference | 0.001 | 0.011 |
| Light leakage reduction effect | 85% | 65% |

(Example 2)

Figure 9:
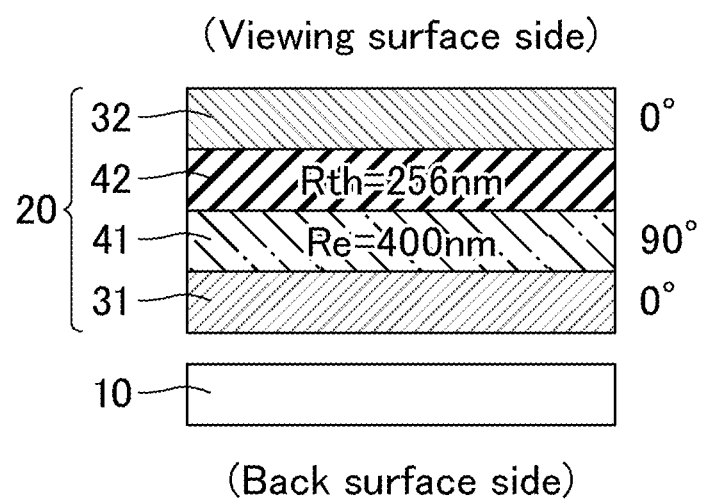
FIG. 9 is a schematic cross-sectional view of an optical element 20 of Example 2.

The arrangement of polarizers and phase difference layers in an optical element 20 of Example 2 is the same as in Example 1. FIG. 9 is a schematic cross-sectional view of the optical element 20 of Example 2. The light leakage reduction effect and color difference at an oblique viewing angle of this optical element 20 were evaluated by the above methods, with the first phase difference layer 41 (+A-plate) configured to introduce an in-plane phase difference Re of 400 nm and the second phase difference layer 42 (+C-plate) configured to introduce a thickness direction phase difference Rth of 256 nm. Table 2 shows the results.

TABLE 2

|  | Comparative Example 1 | Example 2 |
|---|---|---|
| Rth (+C-plate) |  | 256 nm |
| Re (+A-plate) | 250 nm | 400 nm |
| Color difference | 0.001 | 0.022 |
| Light leakage reduction effect | 85% | 45% |

(Example 3)

Figure 10:
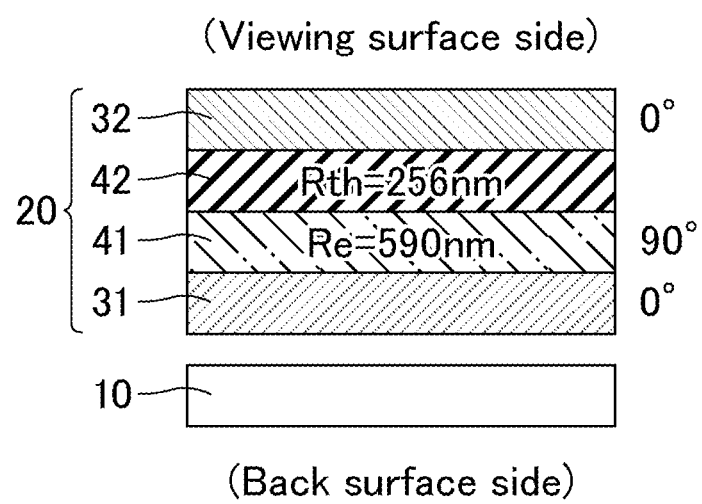
FIG. 10 is a schematic cross-sectional view of an optical element 20 of Example 3.

The arrangement of polarizers and phase difference layers in an optical element 20 of Example 3 is the same as in Example 1. FIG. 10 is a schematic cross-sectional view of the optical element 20 of Example 3. The light leakage reduction effect and color difference at an oblique viewing angle of this optical element 20 were evaluated by the above methods, with the first phase difference layer 41 (+A-plate) configured to introduce an in-plane phase difference Re of 590 nm and the second phase difference layer 42 (+C-plate) configured to introduce a thickness direction phase difference Rth of 256 nm. Table 3 shows the results.

TABLE 3

|  | Comparative Example 1 | Example 3 |
|---|---|---|
| Rth (+C-plate) |  | 256 nm |
| Re (+A-plate) | 250 nm | 590 nm |
| Color difference | 0.001 | 0.023 |
| Light leakage reduction effect | 85% | 77% |

(Example 4)

Figure 11:
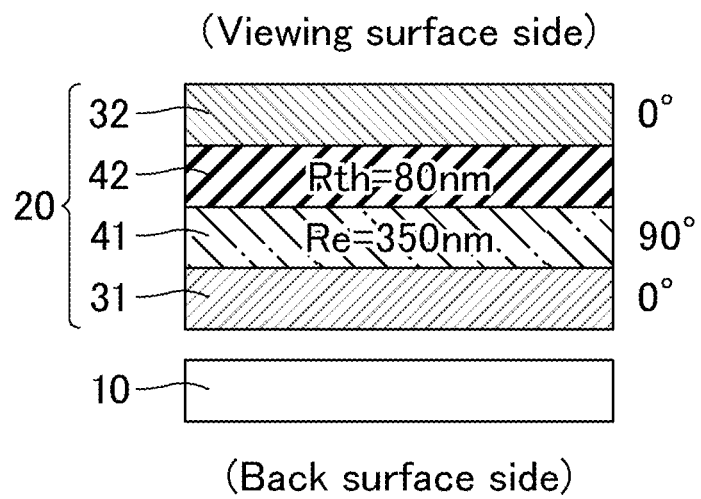
FIG. 11 is a schematic cross-sectional view of an optical element 20 of Example 4.

The arrangement of polarizers and phase difference layers in an optical element 20 of Example 4 is the same as in Example 1. FIG. 11 is a schematic cross-sectional view of the optical element 20 of Example 4. The light leakage reduction effect and color difference at an oblique viewing angle of this optical element 20 were evaluated by the above methods, with the first phase difference layer 41 (+A-plate) configured to introduce an in-plane phase difference Re of 350 nm and the second phase difference layer 42 (+C-plate) configured to introduce a thickness direction phase difference Rth of 80 nm. Table 4 shows the results.

TABLE 4

|  | Comparative Example 1 | Example 4 |
|---|---|---|
| Rth (+C-plate) |  | 80 nm |
| Re (+A-plate) | 250 nm | 350 nm |
| Color difference | 0.001 | 0.002 |
| Light leakage reduction effect | 85% | 79% |

(Example 5)

Figure 12:
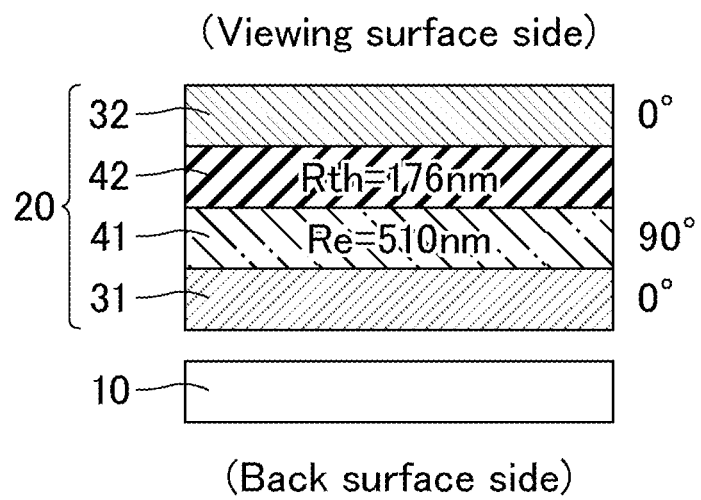
FIG. 12 is a schematic cross-sectional view of an optical element 20 of Example 5.

The arrangement of polarizers and phase difference layers in an optical element 20 of Example 5 is the same as in Example 1. FIG. 12 is a schematic cross-sectional view of the optical element 20 of Example 5. The light leakage reduction effect and color difference at an oblique viewing angle of this optical element 20 were evaluated by the above methods, with the first phase difference layer 41 (+A-plate) configured to introduce an in-plane phase difference Re of 510 nm and the second phase difference layer 42 (+C-plate) configured to introduce a thickness direction phase difference Rth of 176 nm. Table 5 shows the results.

TABLE 5

|  | Comparative Example 1 | Example 5 |
|---|---|---|
| Rth (+C-plate) |  | 176 nm |
| Re (+A-plate) | 250 nm | 510 nm |
| Color difference | 0.001 | 0.015 |
| Light leakage reduction effect | 85% | 79% |

(Example 6)

Figure 13:
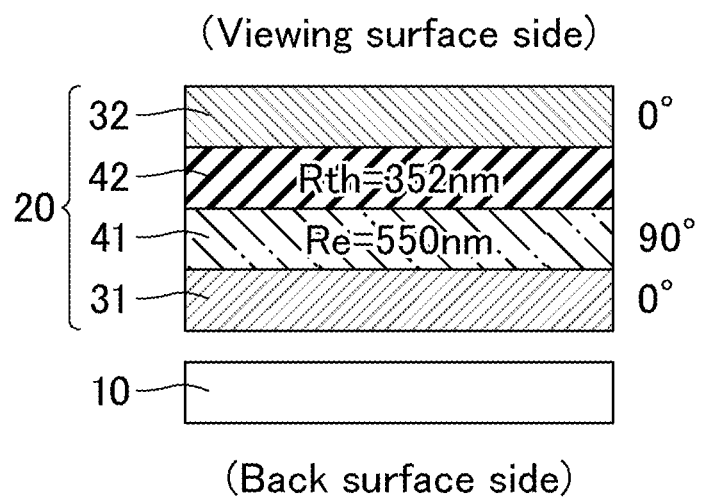
FIG. 13 is a schematic cross-sectional view of an optical element 20 of Example 6.

The arrangement of polarizers and phase difference layers in an optical element 20 of Example 6 is the same as in Example 1. FIG. 13 is a schematic cross-sectional view of the optical element 20 of Example 6. The light leakage reduction effect and color difference at an oblique viewing angle of this optical element 20 were evaluated by the above methods, with the first phase difference layer 41 (+A-plate) configured to introduce an in-plane phase difference Re of 550 nm and the second phase difference layer 42 (+C-plate) configured to introduce a thickness direction phase difference Rth of 352 nm. Table 6 shows the results.

TABLE 6

|  | Comparative Example 1 | Example 6 |
|---|---|---|
| Rth (+C-plate) |  | 352 nm |
| Re (+A-plate) | 250 nm | 550 nm |
| Color difference | 0.001 | 0.022 |
| Light leakage reduction effect | 85% | 50% |

(Example 7)

Figure 14:
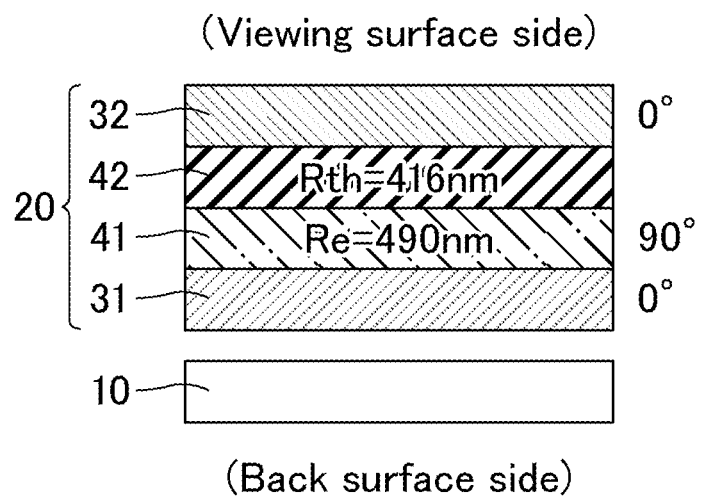
FIG. 14 is a schematic cross-sectional view of an optical element 20 of Example 7.

The arrangement of polarizers and phase difference layers in an optical element 20 of Example 7 is the same as in Example 1. FIG. 14 is a schematic cross-sectional view of the optical element 20 of Example 7. The light leakage reduction effect and color difference at an oblique viewing angle of this optical element 20 were evaluated by the above methods, with the first phase difference layer 41 (+A-plate) configured to introduce an in-plane phase difference Re of 490 nm and the second phase difference layer 42 (+C-plate) configured to introduce a thickness direction phase difference Rth of 416 nm. Table 7 shows the results.

TABLE 7

|  | Comparative Example 1 | Example 7 |
|---|---|---|
| Rth (+C-plate) |  | 416 nm |
| Re (+A-plate) | 250 nm | 490 nm |
| Color difference | 0.001 | 0.023 |
| Light leakage reduction effect | 85% | 25% |

(Example 8)

Figure 15:
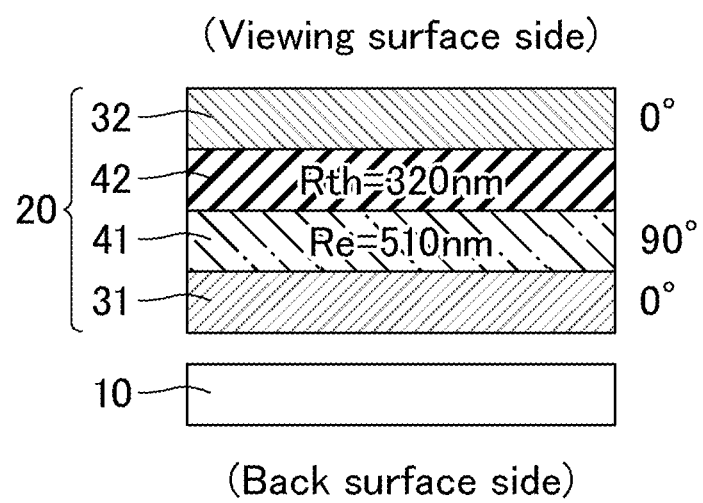
FIG. 15 is a schematic cross-sectional view of an optical element 20 of Example 8.

The arrangement of polarizers and phase difference layers in an optical element 20 of Example 8 is the same as in Example 1. FIG. 15 is a schematic cross-sectional view of the optical element 20 of Example 8. The light leakage reduction effect and color difference at an oblique viewing angle of this optical element 20 were evaluated by the above methods, with the first phase difference layer 41 (+A-plate) configured to introduce an in-plane phase difference Re of 510 nm and the second phase difference layer 42 (+C-plate) configured to introduce a thickness direction phase difference Rth of 320 nm. Table 8 shows the results.

TABLE 8

|  | Comparative Example 1 | Example 8 |
|---|---|---|
| Rth (+C-plate) |  | 320 nm |
| Re (+A-plate) | 250 nm | 510 nm |
| Color difference | 0.001 | 0.006 |
| Light leakage reduction effect | 85% | 49% |

(Example 9)

Figure 16:
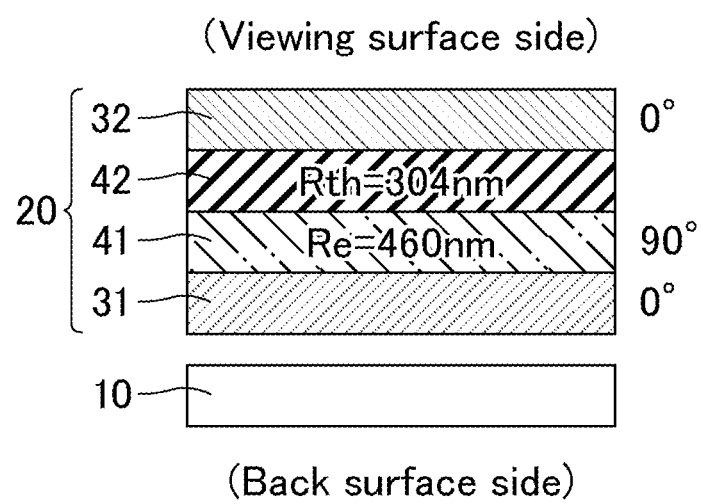
FIG. 16 is a schematic cross-sectional view of an optical element 20 of Example 9.

The arrangement of polarizers and phase difference layers in an optical element 20 of Example 9 is the same as in Example 1. FIG. 16 is a schematic cross-sectional view of the optical element 20 of Example 9. The light leakage reduction effect and color difference at an oblique viewing angle of this optical element 20 were evaluated by the above methods, with the first phase difference layer 41 (+A-plate) configured to introduce an in-plane phase difference Re of 460 nm and the second phase difference layer 42 (+C-plate) configured to introduce a thickness direction phase difference Rth of 304 nm. Table 9 shows the results.

TABLE 9

|  | Comparative Example 1 | Example 9 |
|---|---|---|
| Rth (+C-plate) |  | 304 nm |
| Re (+A-plate) | 250 nm | 460 nm |
| Color difference | 0.001 | 0.006 |
| Light leakage reduction effect | 85% | 43% |

(Example 10)

Figure 17:
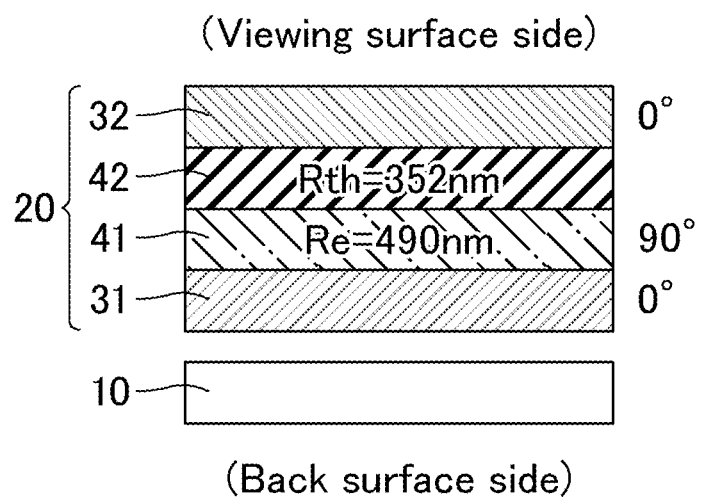
FIG. 17 is a schematic cross-sectional view of an optical element 20 of Example 10.

The arrangement of polarizers and phase difference layers in an optical element 20 of Example 10 is the same as in Example 1. FIG. 17 is a schematic cross-sectional view of the optical element 20 of Example 10. The light leakage reduction effect and color difference at an oblique viewing angle of this optical element 20 were evaluated by the above methods, with the first phase difference layer 41 (+A-plate) configured to introduce an in-plane phase difference Re of 490 nm and the second phase difference layer 42 (+C-plate) configured to introduce a thickness direction phase difference Rth of 352 nm. Table 10 shows the results.

TABLE 10

|  | Comparative Example 1 | Example 10 |
|---|---|---|
| Rth (+C-plate) |  | 352 nm |
| Re (+A-plate) | 250 nm | 490 nm |
| Color difference | 0.001 | 0.002 |
| Light leakage reduction effect | 85% | 38% |

(Example 11)

Figure 18:
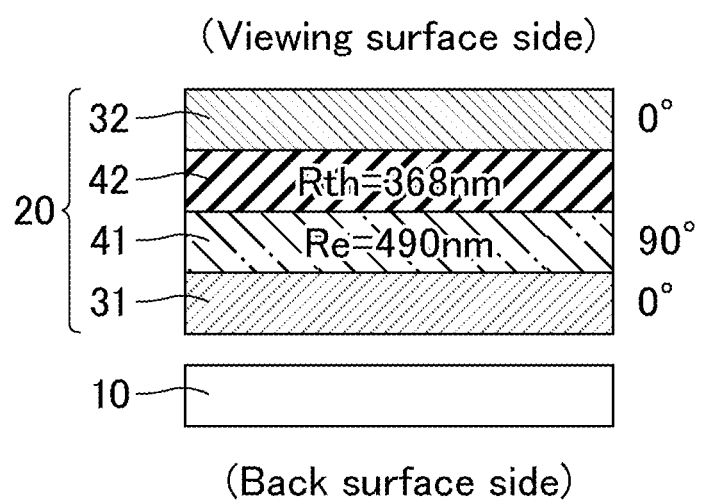
FIG. 18 is a schematic cross-sectional view of an optical element 20 of Example 11.

The arrangement of polarizers and phase difference layers in an optical element 20 of Example 11 is the same as in Example 1. FIG. 18 is a schematic cross-sectional view of the optical element 20 of Example 11. The light leakage reduction effect and color difference at an oblique viewing angle of this optical element 20 were evaluated by the above methods, with the first phase difference layer 41 (+A-plate) configured to introduce an in-plane phase difference Re of 490 nm and the second phase difference layer 42 (+C-plate) configured to introduce a thickness direction phase difference Rth of 368 nm. Table 11 shows the results.

TABLE 11

|  | Comparative Example 1 | Example 11 |
|---|---|---|
| Rth (+C-plate) |  | 368 nm |
| Re (+A-plate) | 250 nm | 490 nm |
| Color difference | 0.001 | 0.006 |
| Light leakage reduction effect | 85% | 35% |

(Example 12)

Figure 19:
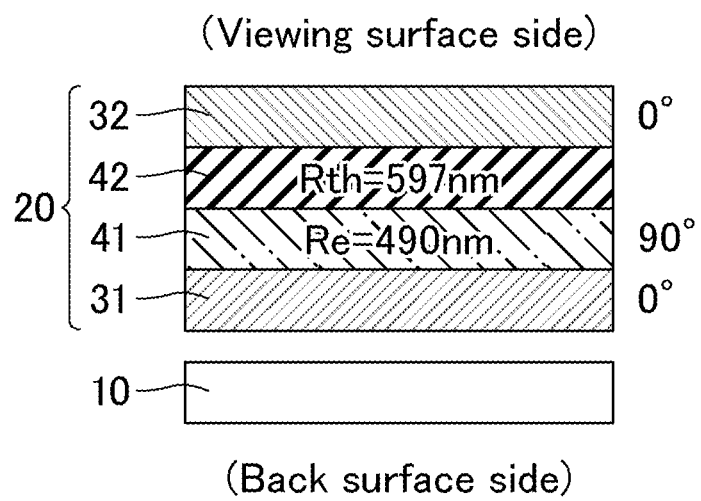
FIG. 19 is a schematic cross-sectional view of an optical element 20 of Example 12.

The arrangement of polarizers and phase difference layers in an optical element 20 of Example 12 is the same as in Example 1. FIG. 19 is a schematic cross-sectional view of the optical element 20 of Example 12. The light leakage reduction effect and color difference at an oblique viewing angle of this optical element 20 were evaluated by the above methods, with the first phase difference layer 41 (+A-plate) configured to introduce an in-plane phase difference Re of 490 nm and the second phase difference layer 42 (+C-plate) configured to introduce a thickness direction phase difference Rth of 597 nm. Table 12 shows the results. Table 12 also shows, for comparison, the thickness direction phase difference Rth introduced by the phase difference layer 40 (+C-plate or biaxial phase difference plate) when the color difference is minimum in each of Comparative Examples 2 and 3 and the evaluation results of Comparative Examples 2 and 3.

TABLE 12

|  | Comparative Example 12 | Comparative Example 13 | Example 12 |
|---|---|---|---|
| Rth (+C-plate) | 600 nm | Rth 600 nm | 597 nm |
| Re (+A-plate) |  | NZ-9.5 | 490 nm |
| Color difference | 0.088 | 0.025 | 0.003 |
| Light leakage reduction effect | 9% | 21% | 3% |

(Example 13)

Figure 20:
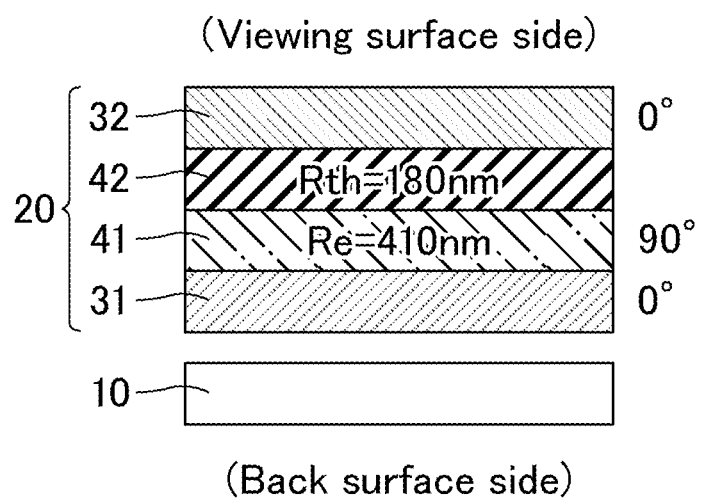
FIG. 20 is a schematic cross-sectional view of an optical element 20 produced in Example 13.

In the present example, a sample was actually produced and examined. First, an optical element 20 having a configuration as shown in FIG. 20 was fabricated. This optical element 20 includes, as shown in FIG. 20, a first polarizer 31, a first phase difference layer 41 whose slow axis is orthogonal to the absorption axis of the first polarizer 31, a second phase difference layer 42, and a second polarizer 32 disposed in parallel Nicols with the first polarizer 31 sequentially from the back surface side (backlight 10 side). The first phase difference layer 41 was a +A-plate. The second phase difference layer 42 was a +C-plate. FIG. 20 is a schematic cross-sectional view of the optical element 20 of Example 13.

Specifically, the first and second polarizers 31 and 32 were absorptive polarizers, and the light source of the backlight 10 was the white light source in "GC5000" available from Nippon Denshoku Industries Co., Ltd. The first phase difference layer 41 was a stack (cycloolefin polymer (COP) film exhibiting flat wavelength dispersion) of a half-wave plate (Re=270 nm) and a λ/4 waveplate (Re=140 nm). The in-plane phase difference Re introduced by the first phase difference layer 41 as a whole was 410 nm. The second phase difference layer 42 was a polymerizable liquid crystal-coated film exhibiting positive wavelength dispersion.

The light leakage reduction effect and color difference at an oblique viewing angle of the optical element 20 obtained in Example 13 were evaluated by the above methods. Table 13 shows the results (measured values).

TABLE 13

|  | Example 13 |
|---|---|
| Rth (+C-plate) | 180 nm |
| Re (+A-plate) | 410 nm |
| Color difference | 0.006 |
| Light leakage reduction effect | 79% |

Table 1 to 13 show that the optical elements 20 of Examples 1 to 13 meet the criteria for determining that the light leakage reduction effect and the color difference control effect are high (light leakage reduction effect of 85% or lower and color difference Oxy of less than 0.025), thus confirming the effects. The results determine that a liquid crystal display device including any one of the optical elements 20 of Examples 1 to 13 can achieve both color difference control and luminance reduction at an oblique viewing angle and has especially high display quality.

Figure 21:
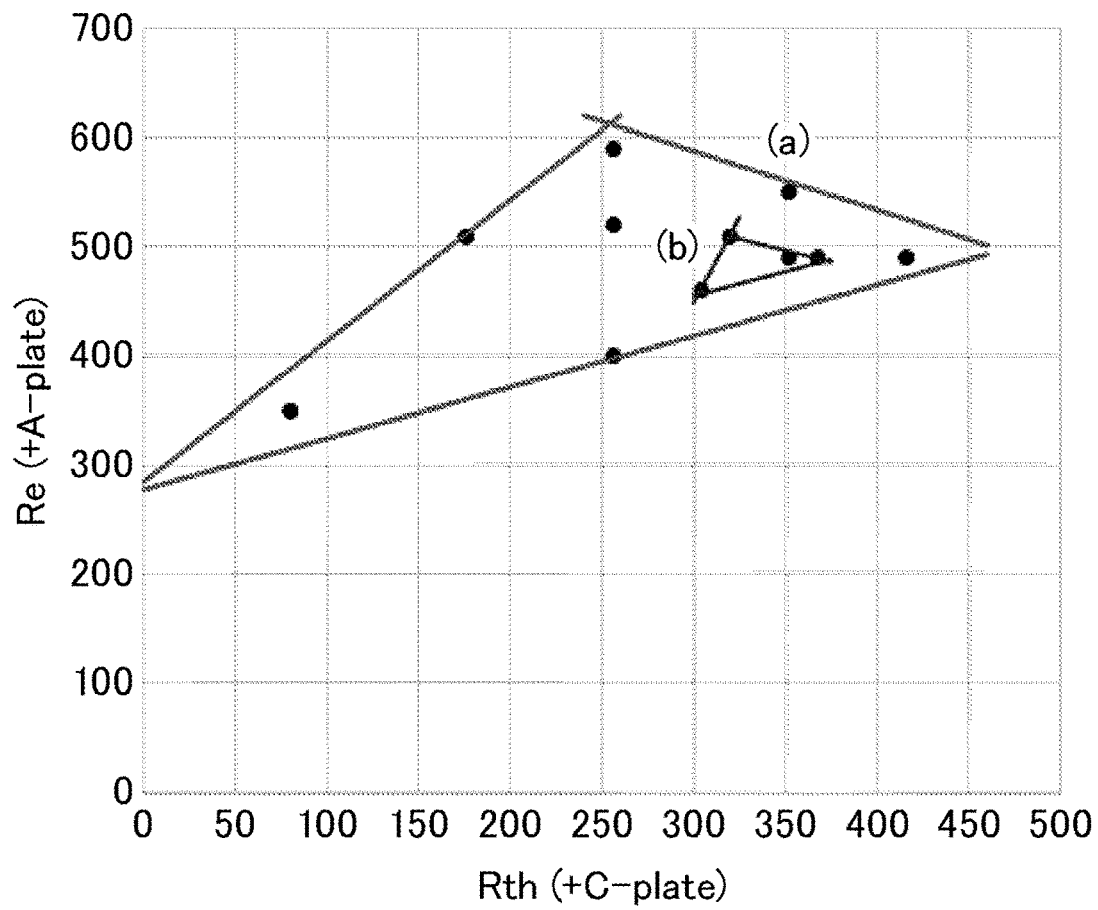
FIG. 21 is a graph of the configurations of Examples 1 to 11, with in-plane phase difference Re of a phase difference layer 41 (+A-plate) plotted on the vertical axis versus thickness direction phase difference Rth of a phase difference layer 42 (+C-plate) plotted on the horizontal axis.

FIG. 21 is a graph of the configurations of Examples 1 to 11, with in-plane phase difference Re of the phase difference layer 41 (+A-plate) plotted on the vertical axis versus thickness direction phase difference Rth of the phase difference layer 42 (+C-plate) plotted on the horizontal axis. The area surrounded by the external triangular frame (a) corresponds to the range satisfying the formulas (1), (2), and (3) which are relational expressions between Re and Rth described above. Within this range, the color difference control effect and luminance reduction effect at an oblique viewing angle can be even higher. Example 13 also falls within this range. The area surrounded by the internal triangular frame (b) corresponds to the range satisfying the formulas (4), (5), and (6) described above. This range is particularly suitable since the above effects can be even more significant.

(Example 14)

Figure 22:
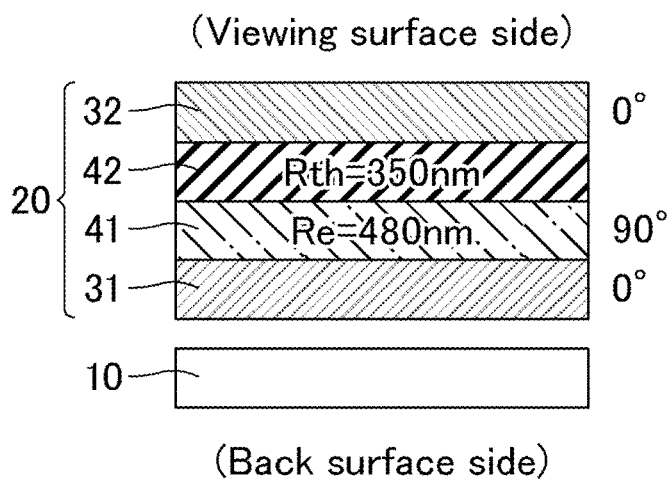
FIG. 22 is a schematic cross-sectional view of an optical element 20 produced in Example 14.

An optical element 20 of Example 14 includes, as shown in FIG. 22, a first polarizer 31, a first phase difference layer 41 whose slow axis is orthogonal to the absorption axis of the first polarizer 31, a second phase difference layer 42, and a second polarizer 32 disposed in parallel Nicols with the first polarizer 31 sequentially from the back surface side (backlight 10 side). The first phase difference layer 41 was a +A-plate. The second phase difference layer 42 was a +C-plate. The first and second polarizers 31 and 32 were absorptive polarizers. FIG. 22 is a schematic cross-sectional view of the optical element 20 of the present example.

Here, the in-plane phase difference Re introduced by the +A-plate is set to 480 nm, and the thickness direction phase difference Rth introduced by the +C-plate is set to 350 nm.

The +C-plate introducing the thickness direction phase difference Rth exhibits positive wavelength dispersion, and the thickness direction phase difference Rth introduced at a wavelength λ, represented by "R(λ)", was set to satisfy the following formulas (8) and (9).

$$R(450 \text{ nm})/R(550 \text{ nm}) = 1.05 \quad (8)$$

$$R(650 \text{ nm})/R(550 \text{ nm}) = 0.97 \quad (9)$$

The +A-plate introducing the in-plane phase difference Re was set to exhibit flat wavelength dispersion, and the in-plane phase difference Re introduced at a wavelength λ, represented by "R(λ)", was set to satisfy the following formulas (10) and (11).

$$R(450 \text{ nm})/R(550 \text{ nm}) = 1.00 \quad (10)$$

$$R(650 \text{ nm})/R(550 \text{ nm}) = 1.00 \quad (11)$$

(Example 15)

Figure 23:
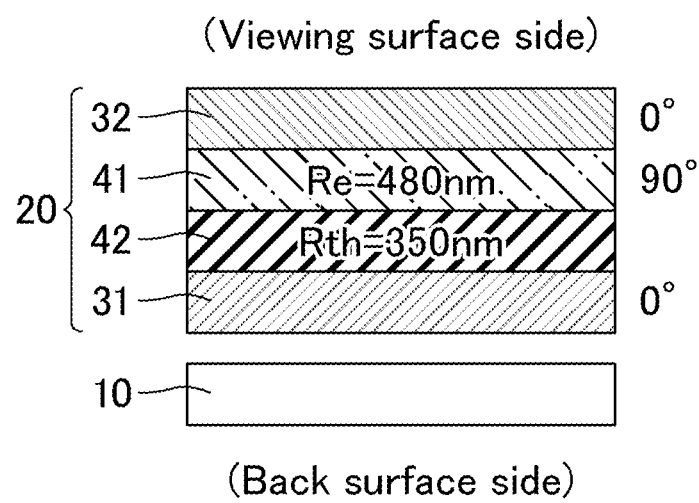
FIG. 23 is a schematic cross-sectional view of an optical element 20 produced in Example 15.

An optical element 20 of Example 15 is one obtained by switching the positions of the +A-plate and the +C-plate in the optical element 20 of Example 14. In other words, the optical element 20 of the present example includes, as shown in FIG. 23, in the following order from the back surface side (backlight 10 side), the first polarizer 31, the first phase difference layer 41 (+C-plate), the second phase difference layer 42 (+A-plate) whose slow axis was orthogonal to the absorption axis of the first polarizer 31, and the second polarizer 32 disposed in parallel Nicols with the first polarizer 31. FIG. 23 is a schematic cross-sectional view of the optical element 20 of the present example.

(Example 16)

Figure 24:
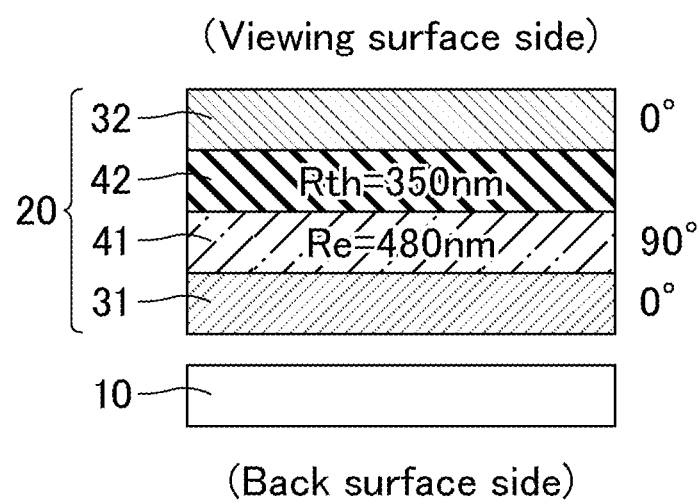
FIG. 24 is a schematic cross-sectional view of an optical element 20 produced in Example 16.

An optical element 20 of Example 16 is obtained by replacing the +A-plate and the +C-plate in the optical element 20 of Example 14 with a −A-plate and a −C-plate, respectively. In other words, the optical element 20 of the present example includes, as shown in FIG. 24, the first polarizer 31, a first phase difference layer 41 (−A-plate) whose slow axis is orthogonal to the absorption axis of the first polarizer 31, a second phase difference layer 42 (−C-plate), and the second polarizer 32 disposed in parallel Nicols with the first polarizer 31 sequentially from the back surface side (backlight 10 side). FIG. 24 is a schematic cross-sectional view of the optical element 20 of the present example.

(Example 17)

Figure 25:
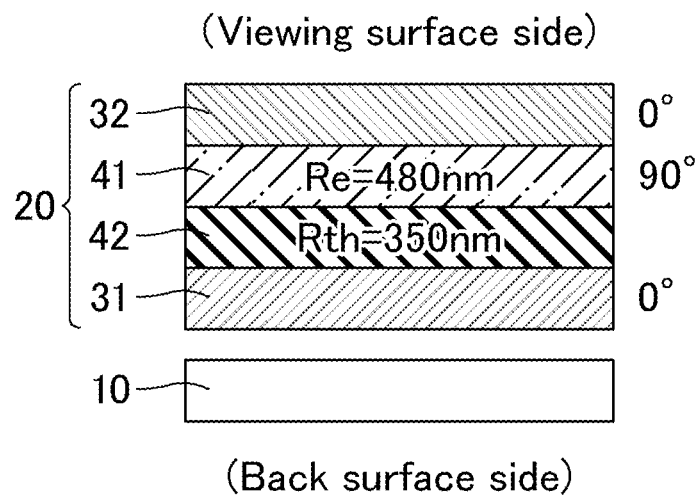
FIG. 25 is a schematic cross-sectional view of an optical element 20 produced in Example 17.
Figure 26A:
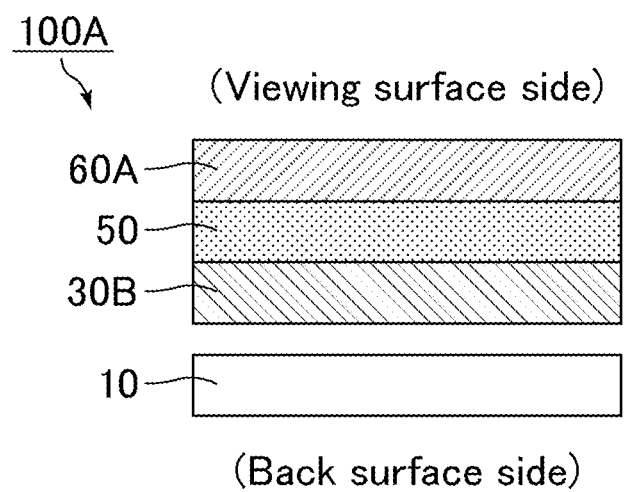
FIG. 26A is a schematic cross-sectional view of an example of a conventional liquid crystal display device.
Figure 26B:
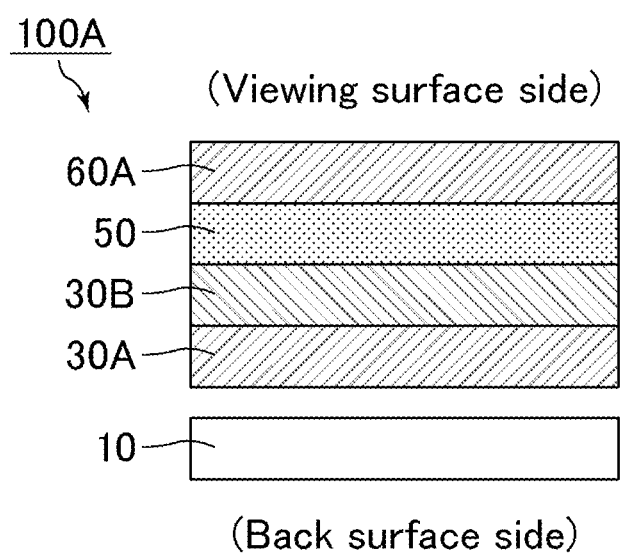
FIG. 26B is a schematic cross-sectional view of another example of a conventional liquid crystal display device.

An optical element 20 of Example 17 is obtained by replacing the +A-plate and the +C-plate in the optical element 20 of Example 15 with a −A-plate and a −C-plate, respectively. In other words, the optical element 20 of the present example includes, as shown in FIG. 25, the first polarizer 31, a first phase difference layer 41 (−C-plate), a second phase difference layer 42 (−A-plate) whose slow axis is orthogonal to the absorption axis of the first polarizer 31, and the second polarizer 32 disposed in parallel Nicols with the first polarizer 31 sequentially from the back surface side (backlight 10 side). FIG. 25 is a schematic cross-sectional view of the optical element 20 of the present example.

The light leakage reduction effect and color difference at an oblique viewing angle in the optical elements 20 of Examples 14 to 17 were evaluated by the above methods. Table 14 shows the results.

TABLE 14

|  | Example 14 | Example 15 | Example 16 | Example 17 |
| --- | --- | --- | --- | --- |
| Configuration | +A, +C from light source side | +C, +A from light source side | −A, −C from light source side | −C, −A from light source side |
| Color difference | 0.003 | 0.003 | 0.003 | 0.003 |
| Light leakage reduction effect | 36.5% | 36.5% | 36.5% | 36.5% |

In the optical element of Example 14 (and those of Examples 1 to 13), the first phase difference layer 41 is a phase difference layer satisfying the formula (i), and the second phase difference layer 42 is a phase difference layer satisfying the formula (ii).

In the optical element of Example 15, the first phase difference layer 41 is a phase difference layer satisfying the formula (ii), and the second phase difference layer 42 is a phase difference layer satisfying the formula (i).

In the optical element of Example 16, the first phase difference layer 41 is a phase difference layer satisfying the formula (iii), and the second phase difference layer 42 is a phase difference layer satisfying the formula (iv).

In the optical element of Example 17, the first phase difference layer 41 is a phase difference layer satisfying the formula (iv), and the second phase difference layer 42 is a phase difference layer satisfying the formula (iii).

Table 14 shows that in Examples 15 to 17, substantially the same effects (i.e., light leakage reduction effect and color difference control effect) as in Example 14 can be achieved.

In other words, when the combination of the first phase difference layer 41 and the second phase difference layer 42 is a combination of one of the first phase difference layer 41 and the second phase difference layer 42 satisfying the formula (i) and the other satisfying the formula (ii), or a combination of one of the first phase difference layer 41 and the second phase difference layer 42 satisfying the formula (iii) and the other satisfying the formula (iv), a determination can be made that the liquid crystal display device achieves both color difference control and luminance reduction at an oblique viewing angle and has especially high display quality.

The aspects of the present invention described above may be appropriately combined without departing from the gist of the present invention.

REFERENCE SIGNS LIST

10: backlight
20, 20A: optical element
30B, 60A: polarizer
30X: polarization axis (absorption axis or reflection axis) of polarizer
31: (first) polarizer
32: (second) polarizer
40: phase difference layer
41: (first) phase difference layer
42: (second) phase difference layer
50: liquid crystal panel
60: (third) polarizer
100, 100A: liquid crystal display device

What is claimed is:

1. An optical element comprising:
a first polarizer;
a first phase difference layer;
a second phase difference layer; and
a second polarizer,
the first polarizer, the first phase difference layer, the second phase difference layer, and the second polarizer being arranged in the stated order,
one of the first phase difference layer and the second phase difference layer satisfying the following formula (i) while the other of the first phase difference layer and the second phase difference layer satisfying the following formula (ii), or one of the first phase difference layer and the second phase difference layer satisfying the following formula (iii) while the other of the first phase difference layer and the second phase difference layer satisfying the following formula (iv),
the first polarizer and the second polarizer being linear polarizers,
a transmission axis of the first polarizer and a transmission axis of the second polarizer being parallel to each other,
a slow axis of the first phase difference layer and the second phase difference layer, whichever satisfies the following formula (i) or (iii), being orthogonal to a polarization axis of the first polarizer, $$nx > ny \approx nz \tag{i}$$

$$nz > nx \approx ny \tag{ii}$$

$$ny < nx \approx nz \tag{iii}$$

$$nz < nx \approx ny \tag{iv}$$

wherein nx represents a principal refractive index in a slow axis direction in a plane of each of the phase difference layers; ny represents a principal refractive index in a fast axis direction in a plane of each phase difference layer; and nz represents a principal refractive index in a direction vertical to a surface of each phase difference layer.

2. The optical element according to claim 1,
wherein the first phase difference layer satisfies the formula (i), and
the second phase difference layer satisfies the formula (ii).

3. The optical element according to claim 1,
wherein an in-plane retardation Re (nm) introduced to light having a wavelength of 550 nm by the first phase difference layer or the second phase difference layer, whichever satisfies the formula (i) or (iii), and a thickness direction retardation Rth (nm) introduced to light having a wavelength of 550 nm by the first phase difference layer or the second phase difference layer, whichever satisfies the formula (ii) or (iv), satisfy the following formulas (1), (2), and (3):

$$Re \geq 0.47 \times Rth + 278 \tag{1}$$

$$Re \leq 1.29 \times Rth + 285 \tag{2}$$

$$Re \leq -0.54 \times Rth + 750 \tag{3}$$

4. The optical element according to claim 1,
wherein an in-plane retardation Re (nm) introduced to light having a wavelength of 550 nm by the first phase difference layer or the second phase difference layer, whichever satisfies the formula (i) or (iii), and a thickness direction retardation Rth (nm) introduced to light having a wavelength of 550 nm by the first phase difference layer or the second phase difference layer, whichever satisfies the formula (ii) or (iv), satisfy the following formulas (4), (5), and (6):

$$Re \geq 0.45 \times Rth + 320 \tag{4}$$

$$Re \leq 3.13 \times Rth - 490 \tag{5}$$

$$Re \leq -0.42 \times Rth + 644 \tag{6}$$

5. The optical element according to claim 1,
wherein when the optical element is irradiated with light from a back surface side of the first polarizer,
a transmittance T2 of oblique light transmitted at an azimuthal angle of 45° and a polar angle of 60° through the second polarizer is 40% or lower relative to a transmittance T1, taken as 100%, of the light transmitted through a configuration without the first phase difference layer or the second phase difference layer, and a color difference Δxy between an azimuthal angle of 0° and an azimuthal angle of 45° with the polar angle fixed at 60° is 0.005 or less.

6. The optical element according to claim 1,
wherein when the optical element is irradiated with light from a back surface side of the first polarizer,
a transmittance T2 of oblique light transmitted at an azimuthal angle of 45° and a polar angle of 60° through the second polarizer is 20% or lower relative to a transmittance T1, taken as 100%, of the light transmitted through a configuration without the first phase difference layer or the second phase difference layer, and a color difference Δxy between an azimuthal angle of 0° and an azimuthal angle of 45° with the polar angle fixed at 60° is 0.015 or less.

7. The optical element according to claim 6,
wherein a thickness direction retardation Rth (nm) introduced by the first phase difference layer or the second phase difference layer, whichever satisfies the formula (ii) or (iv), is 500 nm or more.

8. A liquid crystal display device comprising:
a liquid crystal panel;
the optical element according to claim 1; and
a backlight,
the liquid crystal panel, the optical element, and the backlight being arranged in the stated order from a viewing surface side,
a first polarizer side surface of the optical element facing a viewing surface side of the backlight.

9. A liquid crystal display device comprising:
a liquid crystal panel;
the optical element according to claim 2; and
a backlight,
the liquid crystal panel, the optical element, and the backlight being arranged in the stated order from a viewing surface side,
a first polarizer side surface of the optical element facing a viewing surface side of the backlight.

10. The liquid crystal display device according to claim 8, further comprising a third polarizer on a viewing surface side of the liquid crystal panel.

11. The liquid crystal display device according to claim 9, further comprising a third polarizer on a viewing surface side of the liquid crystal panel.

\* \* \* \* \*